(12) United States Patent
Noh et al.

(10) Patent No.: US 11,784,752 B2
(45) Date of Patent: Oct. 10, 2023

(54) METHOD AND APPARATUS FOR TRANSMITTING PPDU IN DUPLICATE (DUP) MODE IN A WIRELESS COMMUNICATION SYSTEM

(71) Applicant: Senscomm Semiconductor Co., Ltd., Suzhou (CN)

(72) Inventors: Yujin Noh, Irvine, CA (US); Seung Hyeok Ahn, Irvine, CA (US); Seung Ho Choo, Suzhou (CN); Young-Hwan Kang, Pyeongtaek-si (KR); Jungchul Shin, Seoul (KR); Tan Joong Park, Seoul (KR)

(73) Assignee: Senscomm Semiconductor Co., Ltd., Suzhou (CN)

( * ) Notice: Subject to any disclaimer, the term of this patent is extended or adjusted under 35 U.S.C. 154(b) by 0 days.

(21) Appl. No.: 17/675,552

(22) Filed: Feb. 18, 2022

(65) Prior Publication Data

US 2022/0337343 A1  Oct. 20, 2022

Related U.S. Application Data

(60) Provisional application No. 63/223,675, filed on Jul. 20, 2021, provisional application No. 63/177,492, (Continued)

(51) Int. Cl.
*H04L 1/00* (2006.01)
*H04L 1/1607* (2023.01)
(Continued)

(52) U.S. Cl.
CPC .......... *H04L 1/0069* (2013.01); *H04L 1/0013* (2013.01); *H04L 1/1614* (2013.01); *H04L 5/0044* (2013.01); *H04W 84/02* (2013.01)

(58) Field of Classification Search
CPC ... H04B 7/0697; H04B 7/0689; H04L 5/0044; H04L 5/0023; H04L 5/0039;
(Continued)

(56) References Cited

U.S. PATENT DOCUMENTS

2019/0373586 A1* 12/2019 Verma .................. H04B 7/0697
2020/0413482 A1* 12/2020 Takada ................. H04L 1/0006
(Continued)

FOREIGN PATENT DOCUMENTS

WO  WO-2021091341 A1 *  5/2021  .......... H04B 7/0452
WO  WO-2021112644 A1 *  6/2021  ............. H04H 20/95
(Continued)

*Primary Examiner* — Phong La
(74) *Attorney, Agent, or Firm* — BROADVIEW IP LAW, PC

(57) ABSTRACT

A method performed by a transmitter in a wireless communication system is provided. The method comprises: identifying that a first parameter used for indicating a first puncturing pattern is set to be not present in a first frame based on predetermined condition; determining whether to operate in duplicate (DUP) mode; and in case that the transmitter determines to operate in the DUP mode, transmitting a second frame in the DUP mode, wherein data in a payload portion of the second frame is duplicated in frequency in the DUP mode.

10 Claims, 12 Drawing Sheets

Related U.S. Application Data filed on Apr. 21, 2021, provisional application No. 63/174,912, filed on Apr. 14, 2021.

(51) Int. Cl.
  *H04L 5/00* (2006.01)
  *H04W 84/02* (2009.01)

(58) Field of Classification Search
  CPC ... H04L 5/0057; H04L 1/1614; H04L 1/0013; H04L 1/0041; H04L 1/0057; H04L 1/0045
  See application file for complete search history.

(56) References Cited

U.S. PATENT DOCUMENTS

| | | | |
|---|---|---|---|
| 2021/0127291 A1* | 4/2021 | Chen | H04W 28/06 |
| 2021/0227529 A1* | 7/2021 | Chu | H04W 72/23 |
| 2021/0297297 A1* | 9/2021 | Lim | H04L 27/20 |
| 2022/0030572 A1* | 1/2022 | Shellhammer | H04L 5/0064 |
| 2022/0116921 A1* | 4/2022 | Lim | H04L 5/0044 |
| 2022/0158786 A1* | 5/2022 | Lim | H04W 76/30 |
| 2022/0337343 A1* | 10/2022 | Noh | H04B 7/0697 |
| 2023/0006770 A1* | 1/2023 | Park | H04W 72/04 |

FOREIGN PATENT DOCUMENTS

| | | | |
|---|---|---|---|
| WO | WO-2022005196 A1 * | 1/2022 | |
| WO | WO-2022097351 A1 * | 5/2022 | |

\* cited by examiner

FIG. 4
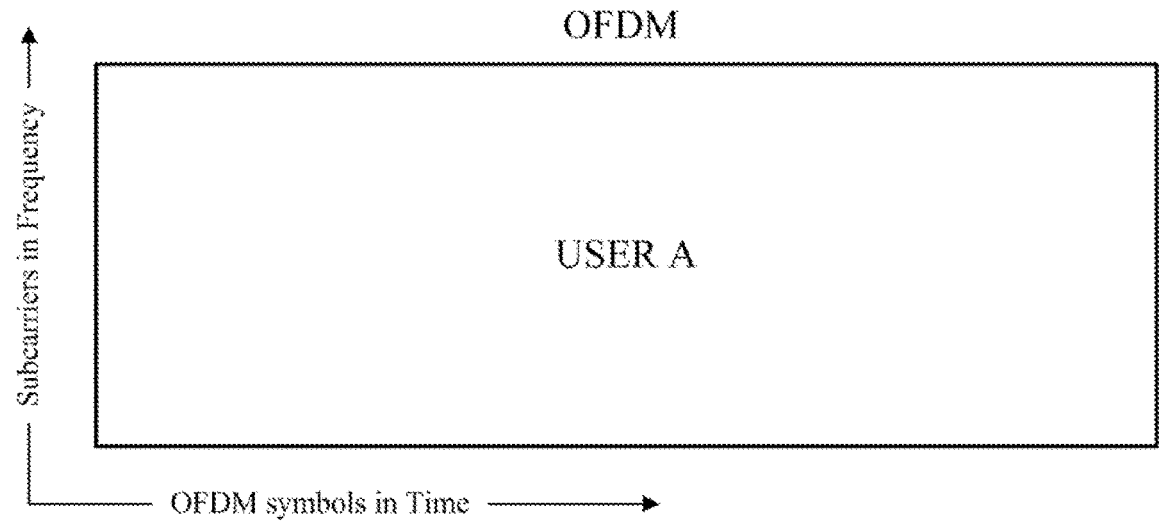
(a)
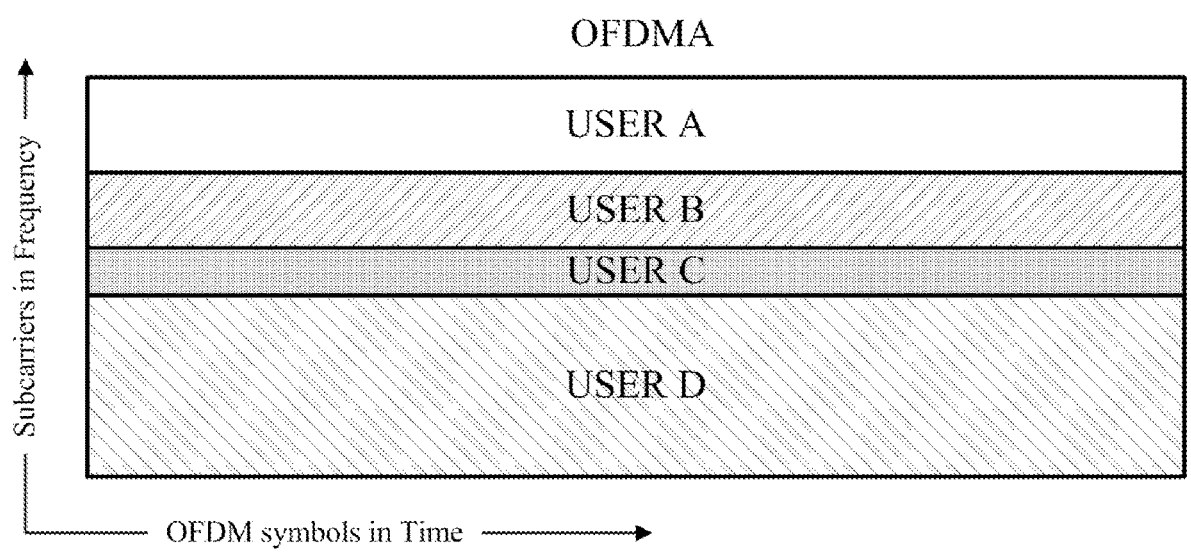
(b)

FIG. 5
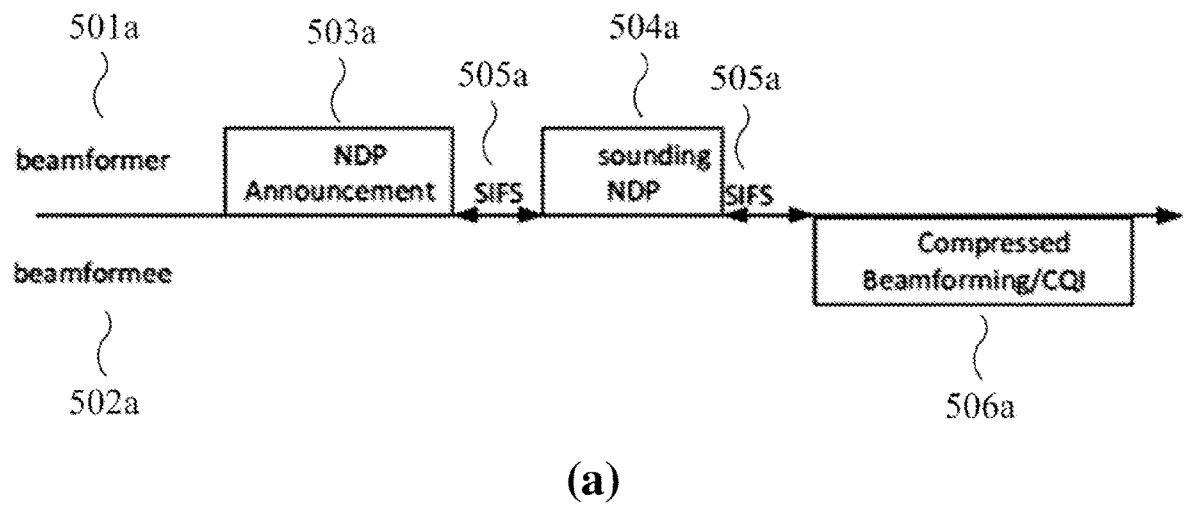
(a)
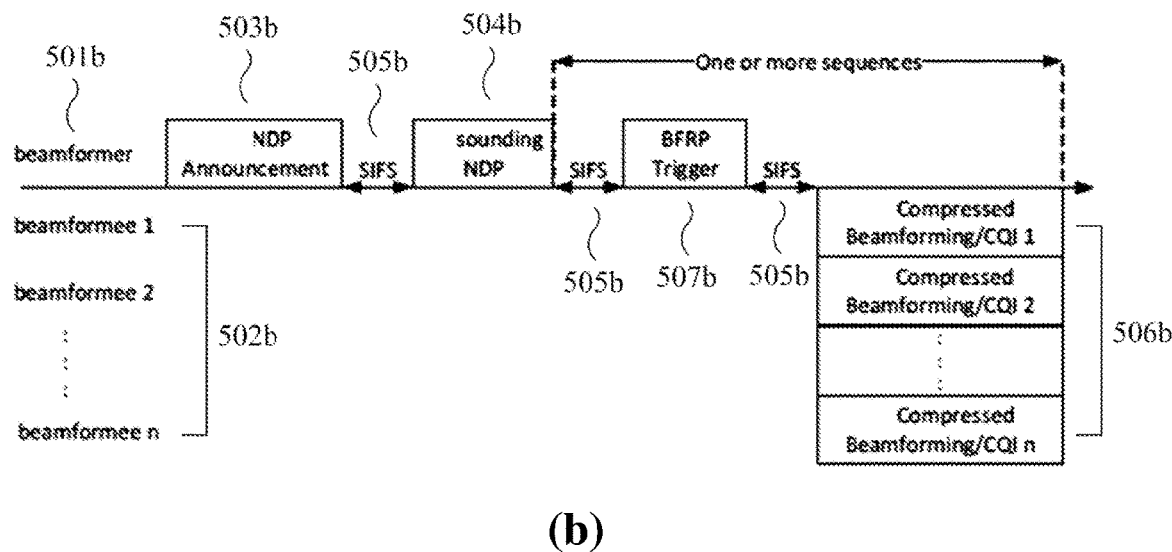
(b)

FIG. 6
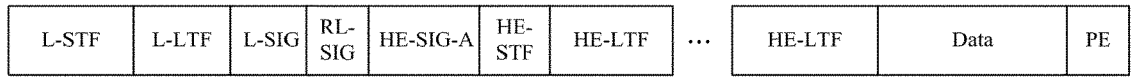
HE SU PPDU format
(a)
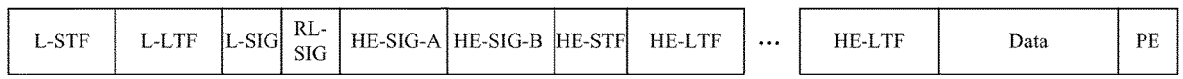
HE MU PPDU format
(b)
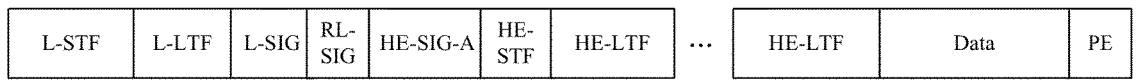
HE ER SU PPDU format
(c)
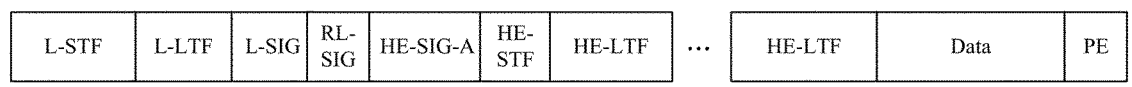
HE TB PPDU format
(d)

METHOD AND APPARATUS FOR TRANSMITTING PPDU IN DUPLICATE (DUP) MODE IN A WIRELESS COMMUNICATION SYSTEM

CROSS REFERENCE TO PRIOR APPLICATIONS

The present application claims priority, under 35 U.S.C. § 119, to U.S. Provisional Patent Application No. 63/174,912 (filed on Apr. 14, 2021), U.S. Provisional Patent Application No. 63/177,492 (filed on Apr. 21, 2021), and U.S. Provisional Patent Application No. 63/223,675 (filed on Jul. 20, 2021), which are all hereby incorporated by reference in their entirety.

BACKGROUND

The present disclosure relates to a method and apparatus for transmission of PPDU with DUP mode in a wireless communication system.

Wi-Fi is a Wireless Local Area Network (WLAN) technology that allows devices to access the Internet in the different frequency bands such as 2.4 GHz, 5 GHz, 6 GHz or 60 GHz frequency bands.

WLANs are based on the Institute of Electrical and Electronic Engineers (IEEE) 802.11 standard. The Wireless Next Generation Standing Committee (WNG SC) of IEEE 802.11 is an ad hoc committee that considers the next generation WLAN in the medium to long term.

The legacy IEEE 802.11a/b/g/n/ac does not guarantee communication stability in dense environments with many users. In order to overcome this limit, the IEEE 802.11ax as the WLAN system supporting High Efficiency (HE) has been developed. The IEEE 802.11ax aims to improve system throughput in dense environments.

Recently, there is a need for a new WLAN system to support maximum data throughput than the data throughput supported by IEEE 802.11ax.

IEEE 802.11be also known as Extremely High Throughput (EHT) WLAN is built upon 802.11ax, focusing on extremely high speed and extremely low latency for the wireless communication service such as 4 k and 8 k video streaming, virtual reality/augmented reality (VR/AR), etc.

The scope of IEEE 802.11be, often discussed in the next-generation WLAN task group, also known as IEEE 802.11be or Extremely High Throughput (EHT) WLAN, includes: 1) 320 MHz bandwidth and more efficient utilization of non-contiguous spectrum, 2) multiple RU (MRU) operation, 3) Multi-band/multi-channel aggregation and operation, 3) 16 spatial streams and Multiple Input Multiple Output (MIMO) protocols enhancements (also referred to multiple link operation (MLO)), 4) 16 spatial streams and Multiple Input Multiple Output (MIMO) protocols enhancements, 5) Multi-Access Point (AP) Coordination (e.g. coordinated and joint transmission), 6) Enhanced link adaptation and retransmission protocol (e.g. Hybrid Automatic Repeat Request (HARD)), 7) if needed, adaptation to regulatory rules specific to 6 GHz spectrum, 8) Integrating Time-Sensitive Networking (TSN) extensions for low-latency real-time traffic (IEEE 802.11aa).

SUMMARY

In one embodiment, a method performed by a transmitter in a wireless communication system is provided. The method comprises: identifying that a first parameter used for indicating a first puncturing pattern is set to be not present in a first frame based on predetermined condition; determining whether to operate in duplicate (DUP) mode; and in cast that the transmitter determines to operate in the DUP mode, transmitting a second frame in the DUP mode, wherein data in a payload portion of the second frame is duplicated in frequency in the DUP mode.

In another embodiment, a method performed by a transmitter in a wireless communication system is provided. The method comprises: identifying that a first parameter used for indicating a first puncturing pattern is set to be present in a first frame; determining whether to operate in duplicate (DUP) mode; and in case that the transmitter determines to operate in the DUP mode, setting a second parameter in a second frame to all 0s and transmitting the second frame in the DUP mode without considering the first puncturing pattern indicated by the first parameter, wherein data in a payload portion of the second frame is duplicated in frequency in the DUP mode.

In yet another embodiment, a transmitter in a wireless communication system is provided. The transmitter comprises: a transceiver; and a processor configured to: identify that a first parameter used for indicating a first puncturing pattern is set to be not present in a first frame based on predetermined condition; determine whether to operate in duplicate (DUP) mode; and in case that the transmitter determines to operate in the DUP mode, control the transceiver to transmit a second frame in the DUP mode, wherein data in a payload portion of the second frame is duplicated in frequency in the DUP mode.

In yet another embodiment, a transmitter in a wireless communication system is provided. The transmitter comprises: a transceiver; and a processor configured to: identify that a first parameter used for indicating a first puncturing pattern is set to be present in a first frame; determine whether to operate in duplicate (DUP) mode; and in case that the transmitter determines to operate in the DUP mode, set a second parameter in a second frame to all 0s and control the transceiver to transmit the second frame in the DUP mode without considering the first puncturing pattern indicated by the first parameter, wherein data in a payload portion of the second frame is duplicated in frequency in the DUP mode. The transmitter includes an extreme high throughput (EHT) STA or an EHT access point (AP). A type of the first frame includes a beacon frame, and the first parameter includes a disabled subchannel bitmap field in the first frame. A type of the second frame includes a EHT PPDU frame, and the second parameter includes an inactive subchannel field in the second frame.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 4 illustrates difference between OFDM and OFDMA according to an embodiment of the present disclosure.

FIG. 5 illustrates a sounding protocol sequence according to an embodiment of the present disclosure.

FIG. 6 illustrates an example of HE PPDU format according to an embodiment of the present disclosure.

DETAILED DESCRIPTION

Figure 1:
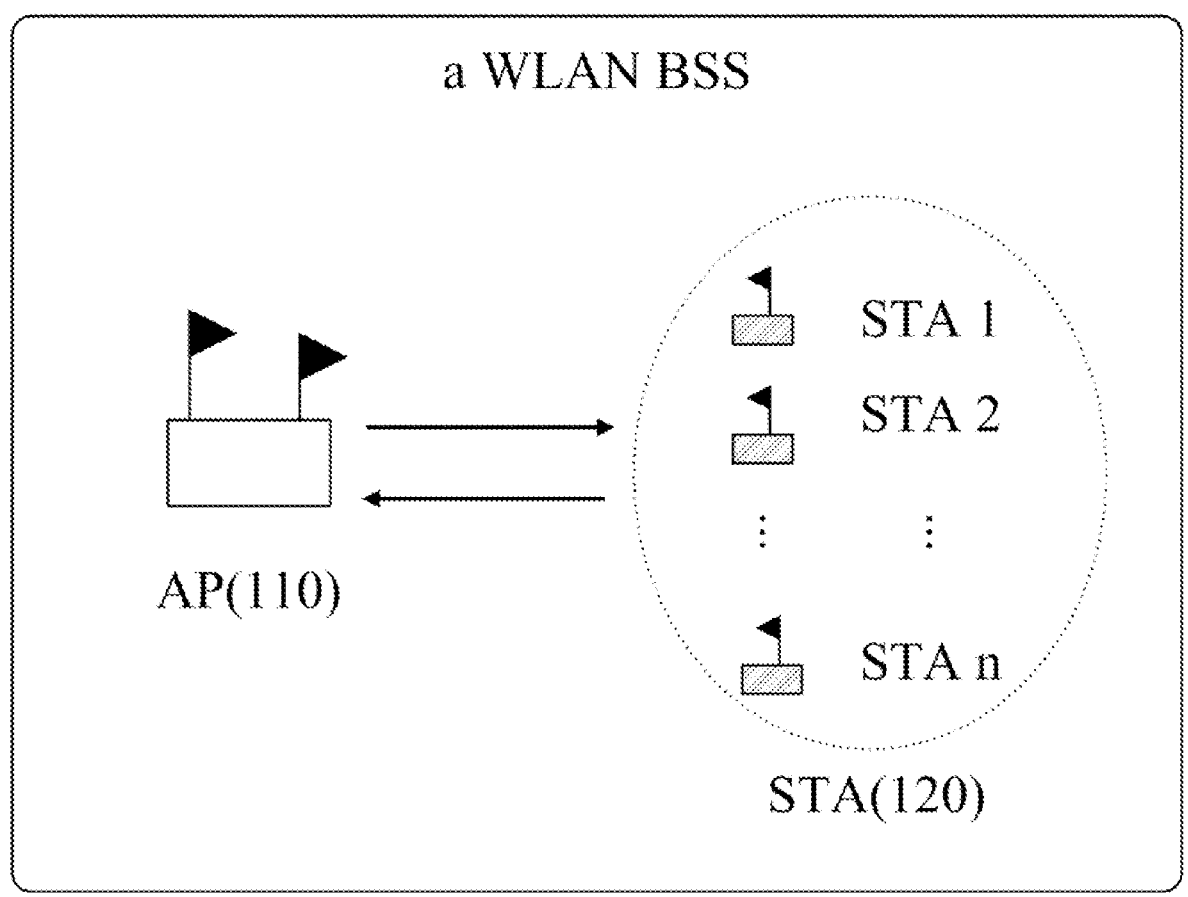
FIG. 1 illustrates an example BSS in a WLAN according to an embodiment of the present disclosure.

The following detailed description of the embodiments of the present disclosure is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

The terms "comprises", "comprising", or any other variations thereof, are intended to cover a non-exclusive inclusion, such that a setup, device, or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

In the following detailed description of the embodiments of the present disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

The following detailed description of the embodiments of the present disclosure applies to a wireless local area network (WLAN). The following description may apply to the next generation WLAN method (IEEE 802.11be) or the like. The IEEE 802.11be maintains compatibility with the conventional IEEE 802.11a/b/g/n/ac/ax (Hereinafter referred to as "11a/b/g/n/ac/ax"). The following description may be executed in the IEEE 802.11be (Hereinafter referred to as "11be") environment, and also maintains compatibility with the conventional 11a/b/g/n/ac/ax.

In a WLAN, a single basic service set (BSS) is composed of two kinds of entity which are a single AP Station (STA) and a plurality of non-AP STAs. STAs share a same radio frequency channel with one out of WLAN operation bandwidth options (e.g., 20/40/80/160/320 MHz). Here, AP STA and non-AP STA could be referred as AP and STA, respectively.

WLAN has included operation of multiple users' frame transmissions and receptions simultaneously wherein frame exchanges are scheduled under the specific rule within a BSS. Here multi-user (MU) transmission means that the frames in a certain BSS are transmitted to (e.g., downlink (DL) MU) or from (e.g., uplink (UL) MU) a plurality of STAs simultaneously based on different resources. For example, different resources could be different frequency resources in orthogonal frequency division multiplexing access (OFDMA) transmission or different spatial streams in multi MU-multiple input multiple output (MIMO) transmission with DL-OFDMA, DL-MU-MIMO, UL-OFDMA, and UL-MU-MIMO of MU transmission as shown in FIG. 1 below.

FIG. 1 illustrates an example BSS in a WLAN according to an embodiment of the present disclosure.

Referring to FIG. 1, a WLAN BSS 100 may include a one AP 110 and a plurality of STAs 120. Any one of the plurality of STAs 120 may receive resource allocated for MU transmission and communicate with the AP 110. The AP 110 may deliver information regarding the resource allocation for MU transmission to any one of the plurality of STAs 120. The plurality of STAs 120 may receive/transmit, from/to the AP 110, the frames simultaneously in the WLAN BSS 100 based on the allocated resources for MU transmission.

Figure 2A:
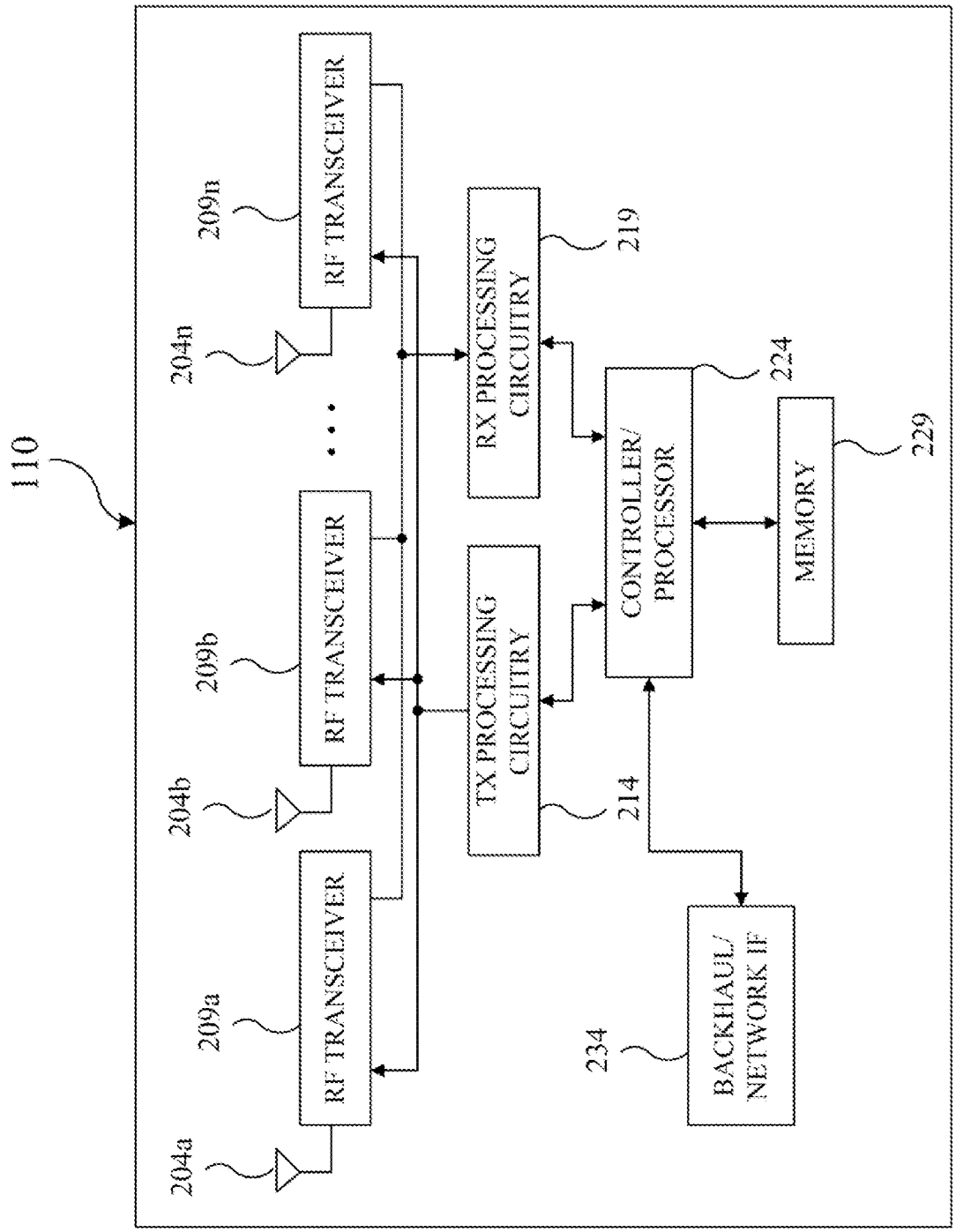
FIG. 2A illustrates an example AP 110 according to an embodiment of the present disclosure.

FIG. 2A illustrates an example AP 110 according to an embodiment of the present disclosure. The embodiment of the AP 110 illustrated in FIG. 2A is for illustration only, and the AP 110 of FIG. 1 could have the same or similar configuration. However, APs come in a wide variety of configurations, and FIG. 2A does not limit the scope of the present disclosure to any particular implementation of an AP.

As shown in FIG. 2A, the AP 110 includes multiple antennas 204 *a*-204 *n*, multiple RF transceivers 209 *a*-209 *n*, transmit (TX) processing circuitry 214, and receive (RX) processing circuitry 219. The AP 110 also includes a controller/processor 224, a memory 229, and a backhaul or network interface 234.

The RF transceivers 209 *a*-209 *n* receive, from the antennas 204 *a*-204 *n*, incoming RF signals, such as signals transmitted by STAs in the WLAN BSS 100. The RF transceivers 209 *a*-209 *n* down-convert the incoming RF signals to generate IF or baseband signals. The IF or baseband signals are sent to the RX processing circuitry 219, which generates processed baseband signals by filtering, decoding, and/or digitizing the baseband or IF signals. The RX processing circuitry 219 transmits the processed baseband signals to the controller/processor 224 for further processing.

The TX processing circuitry 214 receives analog or digital data (such as voice data, web data, e-mail, or interactive video game data) from the controller/processor 224. The TX processing circuitry 214 encodes, multiplexes, and/or digitizes the outgoing baseband data to generate processed baseband or IF signals. The RF transceivers 209 *a*-209 *n* receive the outgoing processed baseband or IF signals from the TX processing circuitry 214 and up-converts the baseband or IF signals to RF signals that are transmitted via the antennas 204 a-204 n.

The controller/processor 224 can include one or more processors or other processing devices that control the overall operation of the AP 110. For example, the controller/processor 224 could control the reception of forward channel signals and the transmission of reverse channel signals by the RF transceivers 209 a-209 n, the RX processing circuitry 219, and the TX processing circuitry 214 in accordance with well-known principles. The controller/processor 224 could support additional functions as well, such as more advanced wireless communication functions. For instance, the controller/processor 224 could support beam forming or directional routing operations in which outgoing signals from multiple antennas 204 a-204 n are weighted differently to effectively steer the outgoing signals in a desired direction. The controller/processor 224 could also support OFDMA operations in which outgoing signals are assigned to different subsets of subcarriers for different recipients (e.g., different STAs). Any of a wide variety of other functions could be supported in the AP 110 by the controller/processor 224 including a combination of DL MU-MIMO and OFDMA in the same transmit opportunity. In some embodiments, the controller/processor 224 includes at least one microprocessor or microcontroller.

The controller/processor 224 is also capable of executing programs and other processes resident in the memory 229, such as an OS. The controller/processor 224 can move data into or out of the memory 229 as required by an executing process.

The controller/processor 224 is also coupled to the backhaul or network interface 234. The backhaul or network interface 234 allows the AP 110 to communicate with other devices or systems over a backhaul connection or over a network. The interface 234 could support communications over any suitable wired or wireless connection(s). For example, the interface 234 could allow the AP 110 to communicate over a wired or wireless local area network or over a wired or wireless connection to a larger network (such as the Internet). The interface 234 includes any suitable structure supporting communications over a wired or wireless connection, such as an Ethernet or RF transceiver.

The memory 229 is coupled to the controller/processor 224. Part of the memory 229 could include a RAM, and another part of the memory 229 could include a Flash memory or other ROM.

As described in more detail below, the AP 110 may include circuitry and/or programming for management of channel sounding procedures in WLANs. Although FIG. 2A illustrates one example of AP 101, various changes may be made to FIG. 2A. For example, the AP 110 could include any number of each component shown in FIG. 2A. As a particular example, an access point could include a number of interfaces 234, and the controller/processor 224 could support routing functions to route data between different network addresses. As another particular example, while shown as including a single instance of TX processing circuitry 214 and a single instance of RX processing circuitry 219, the AP 110 could include multiple instances of each (such as one per RF transceiver). Alternatively, only one antenna and RF transceiver path may be included, such as in legacy APs. Also, various components in FIG. 2A could be combined, further subdivided, or omitted and additional components could be added according to particular needs.

Figure 2B:
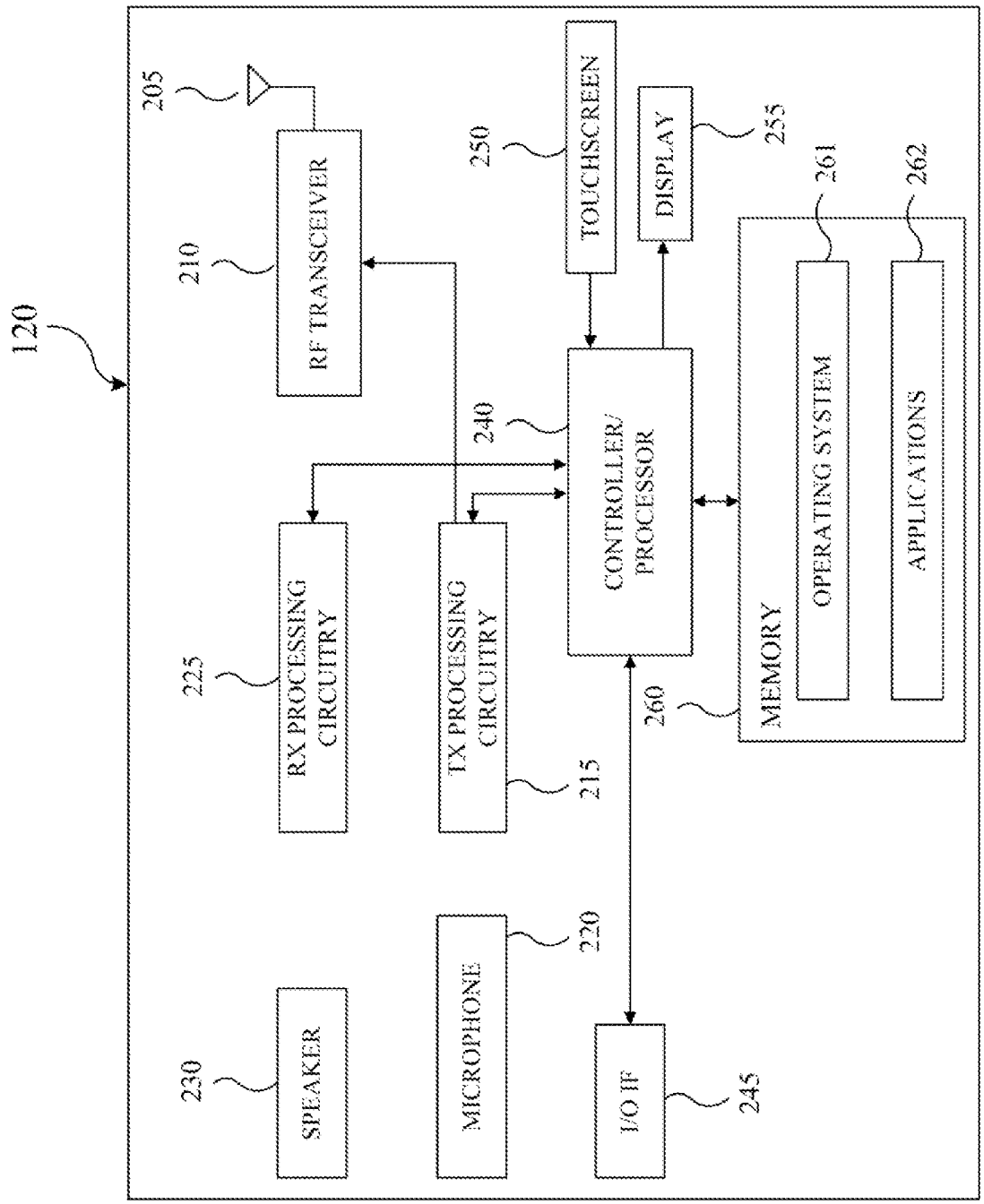
FIG. 2B illustrates an example STA 120 according to an embodiment of the present disclosure.

FIG. 2B illustrates an example STA 121 according to an embodiment of the present disclosure. The embodiment of the STA 121 illustrated in FIG. 2B is for illustration only, and the STAs 120 of FIG. 1 could have the same or similar configuration. However, STAs come in a wide variety of configurations, and FIG. 2B does not limit the scope of the present disclosure to any particular implementation of a STA.

As shown in FIG. 2B, the STA 121 includes antenna(s) 205, a radio frequency (RF) transceiver 210, TX processing circuitry 215, a microphone 220, and receive (RX) processing circuitry 225. The STA 111 also includes a speaker 230, a controller/processor 240, an input/output (I/O) interface (IF) 245, a touchscreen 250, a display 255, and a memory 260. The memory 260 includes an operating system (OS) 261 and one or more applications 262.

The RF transceiver 210 receives, from the antenna(s) 205, an incoming RF signal transmitted by an AP of the WLAN BSS 100. The RF transceiver 210 down-converts the incoming RF signal to generate an intermediate frequency (IF) or baseband signal. The IF or baseband signal is sent to the RX processing circuitry 225, which generates a processed baseband signal by filtering, decoding, and/or digitizing the baseband or IF signal. The RX processing circuitry 225 transmits the processed baseband signal to the speaker 230 (such as for voice data) or to the controller/processor 240 for further processing (such as for web browsing data).

The TX processing circuitry 215 receives analog or digital voice data from the microphone 220 or other outgoing baseband data (such as web data, e-mail, or interactive video game data) from the controller/processor 240. The TX processing circuitry 215 encodes, multiplexes, and/or digitizes the outgoing baseband data to generate a processed baseband or IF signal. The RF transceiver 210 receives the outgoing processed baseband or IF signal from the TX processing circuitry 215 and up-converts the baseband or IF signal to an RF signal that is transmitted via the antenna(s) 205.

The controller/processor 240 can include one or more processors and execute the basic OS program 261 stored in the memory 260 in order to control the overall operation of the STA 120. In one such operation, the main controller/processor 240 controls the reception of forward channel signals and the transmission of reverse channel signals by the RF transceiver 210, the RX processing circuitry 225, and the TX processing circuitry 215 in accordance with well-known principles. The main controller/processor 240 can also include processing circuitry configured to provide management of channel sounding procedures in WLANs. In some embodiments, the controller/processor 240 includes at least one microprocessor or microcontroller.

The controller/processor 240 is also capable of executing other processes and programs resident in the memory 260, such as operations for management of channel sounding procedures in WLANs. The controller/processor 240 can move data into or out of the memory 260 as required by an executing process. In some embodiments, the controller/processor 240 is configured to execute a plurality of applications 262, such as applications for channel sounding, including feedback computation based on a received null data packet (NDP) Announcement frame and NDP frame and transmitting the beamforming feedback report in response to a Trigger frame. The controller/processor 240 can operate the plurality of applications 262 based on the OS program 261 or in response to a signal received from an AP. The main controller/processor 240 is also coupled to the I/O interface 245, which provides STA 120 with the ability to connect to other devices such as laptop computers and handheld computers. The I/O interface 245 is the communication path between these accessories and the main controller 240.

The controller/processor 240 is also coupled to the touchscreen 250 and the display 255. The operator of the STA 120 can use the touchscreen 250 to enter data into the STA 111. The display 255 may be a liquid crystal display, light emitting diode display, or other display capable of rendering text and/or at least limited graphics, such as from web sites.

The memory 260 is coupled to the controller/processor 240. Part of the memory 260 could include a random access memory (RAM), and another part of the memory 260 could include a Flash memory or other read-only memory (ROM).

Although FIG. 2B illustrates one example of STA 120, various changes may be made to FIG. 2B. For example, various components in FIG. 2B could be combined, further subdivided, or omitted and additional components could be added according to particular needs. In particular examples, the STA 120 may include any number of antenna(s) 205 for MIMO communication with an AP 110. In another example, the STA 120 may not include voice communication or the controller/processor 240 could be divided into multiple processors, such as one or more central processing units (CPUs) and one or more graphics processing units (GPUs). Also, while FIG. 2B illustrates the STA 120 configured as a mobile telephone or smartphone, STAs could be configured to operate as other types of mobile or stationary devices.

Multi-user access modulation, for example, OFDMA for uplink and downlink has been introduced since High Efficiency (HE) WLAN, 11ax standard and after such future amendments such as extreme high throughput (EHT), and one or more STAs are allowed to use one or more resource units (RUs) throughout operation bandwidth and transmit at the same time. One RU is the minimum granularity which can be assigned and has decades of subcarriers in OFDM modulation symbol. Here, STAs could be associated or non-associated with AP when responding simultaneously in the assigned RUs within a specific period (e.g., SIFS, short inter frame space) as shown in FIG. 3 below.

Figure 3:
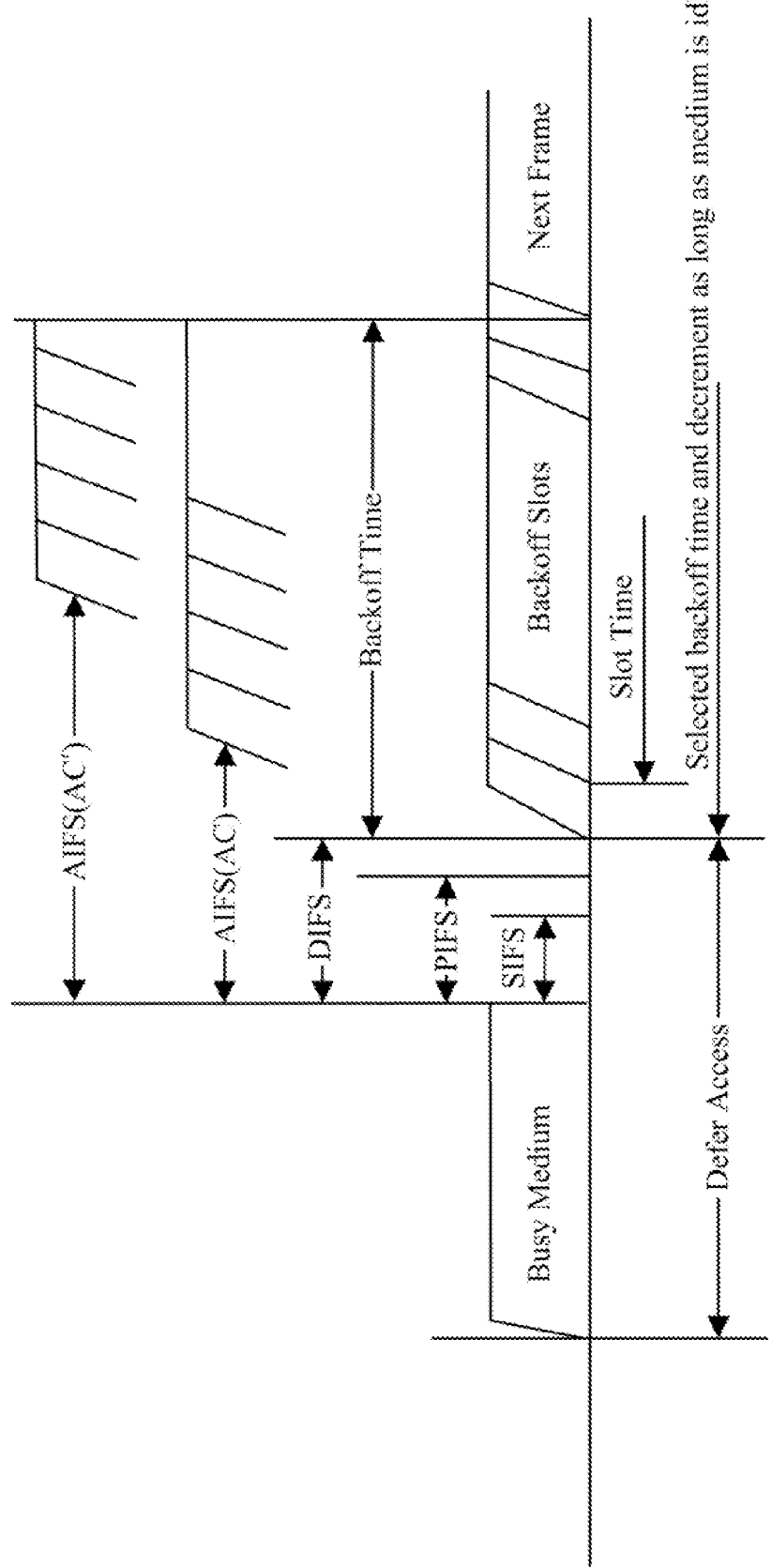
FIG. 3 illustrates different types of IFS in a WLAN according to an embodiment of the present disclosure.

FIG. 3 illustrates different types of IFS in a WLAN according to an embodiment of the present disclosure.

Referring to FIG. 3, inter frame space (IFS) is waiting periods between transmission of frames operating in the medium access control (MAC) sublayer where carrier-sense multi access/collision avoidance (CSMA/CA) is used. For example, IFS is the time period between completion of the transmission of the last frame and starting transmission of the next frame apart from the variable back-off period. The IEEE 802.11 standard defines various types of IFS such as short IFS (SIFS), point coordination function (PCF) IFS (PIFS), distributed coordination function (DCF) IFS (DIFS), and arbitration IFS (AIFS) to provide priority levels for access to wireless media. The relationship between the different IFS is illustrated in FIG. 3. SIFS is used for an acknowledgement (ACK) and for a ready to send (RTS) frame and clear to send (CTS) frame based high priority transmission. For example, if the control frame is a response frame of a previous frame, the WLAN device transmits the control frame without performing backoff if a SIFS has elapsed. PIFS is used in contention-free period (CFP) in PCF mode. For example, after the PIFS has elapsed, STAs having data to be transmitted in contention free period can be initiated. DIFS is used for contention-based services/applications. For example, using DCF mode, a STA needs to sense the status of the wireless channel before the STA can place its request to transmit a frame. AIFS is used by quality of service (QoS) STAs to transmit all data frames management frames (e,g., MAC management protocol data units (MMPDUs)) and control frames (e.g., power save-poll (PS-Poll), RTS, CTS).

OFDMA is an OFDM-based multiple access scheme where different subsets of subcarriers are allocated to different users, allowing simultaneous data transmission to or from one or more users with high accurate synchronization for frequency orthogonality.

FIG. 4 illustrates difference between OFDM and OFDMA according to an embodiment of the present disclosure.

Referring to FIG. 4, in OFDM, a single user (e.g., USER A) is allocated whole subcarriers, while, in OFDMA, a plurality of users (e.g., USER A, USER B, USER C, and USER D) are allocated different subsets of subcarriers which can change from one PPDU to the next. In OFDMA, an OFDM symbol is constructed of subcarriers, the number of which is a function of the PPDU bandwidth.

In case of UL MU transmission, given different STAs with its own capabilities and features, AP may want to have more control mechanism of the medium by using more scheduled access, which may allow more frequent use of OFDMA/MU-MIMO transmissions. PPDUs in UL MU transmission (MU-MIMO or OFDMA) are sent as a response to the trigger frame sent by the AP. Here, UL MU transmission consists of response frames (e.g., HE (or EHT) trigger-based (TB) PPDU) to a trigger frame sent by the AP wherein the trigger frame is supposed to have enough STA's information and assigned RUs. This allows specific STA to transmit the OFDMA based packet format with HE (or EHT) TB PPDU wherein HE (or EHT) TB PPDU is segmented into RU and all RUs as a response of trigger frame are allocated to the selected non-AP STAs accordingly.

In WLAN, there is a sounding protocol sequence as defined with the frame exchange sequences for non-TB sounding sequence and TB sounding sequence as shown in FIG. 5 below.

FIG. 5 illustrates a sounding protocol sequence according to an embodiment of the present disclosure. A (a) of FIG. 5 is an example of a non-TB sounding sequence and a (b) of FIG. 5 is an example of a TB sounding sequence.

Referring to (a) of FIG. 5, the beamformed transmission is initiated with a null data packet (NDP) Announcement frame 503*a* by the beamformer 501*a*. After SIFS 505*a* interval, the NDP frame 504*a* is transmitted to be estimated for channel matrix by for the beamformee 502*a* and beamformee 502*a* calculates the beam matrix. After SIFS 505*a* interval, compressed beamforming/channel quality indicator (CQI) frame 506*a* including feedback information is sent by the beamformee 502*a*. NDP announcement frame 503*a* contains proper signaling to help this procedure for some STAs wherein the STA ID is included in NDP Announcement frame 503*a*.

Referring to (b) of FIG. 5, the beamformed transmission is initiated with a null data packet (NDP) Announcement frame 503*b* by the beamformer 501*b*. After SIFS 505*b* interval, the NDP frame 504*b* is transmitted to be estimated for channel matrix by for the beamformees 502*b* (beamformee 1, beamformee 2, . . . beamformee n) and beamformees 502*b* calculate the beam matrix. After SIFS 505*b*, the beamforming report poll (BFRP) trigger frames 507*b* followed by compressed beamforming/CQI frames 506*b* (compressed beamforming/CQI frame 1, compressed beamforming/CQI frame 2, . . . compressed beamforming/CQI frame n) from a plurality of beamformees 502*b* are exchanged one or more times. NDP announcement frame 503b contains proper signaling to help this procedure for some STAs wherein the STA ID is included in NDP Announcement frame 503b.

FIG. 6 illustrates an example of HE PPDU format according to an embodiment of the present disclosure.

Referring to FIG. 6, in HE WLAN, the four HE PPDU formats are defined: HE SU PPDU for single user transmission ((A) of FIG. 6)), HE MU PPDU for multi-user transmission ((B) of FIG. 6)), HE ER SU PPDU for single user to cover extended coverage ((C) of FIG. 6)), and HE TB PPDU for UL multi-user transmission from STAs ((D) of FIG. 6)). The HE PHY supports a discrete Fourier transform (DFT) period of 3.2 us and 12.8 us for the pre-HE modulated fields and the HE modulated fields in an HE PPDU respectively. The HE PHY data subcarrier frequency spacing in a quarter of legacy very high throughput (VHT), HT PHY, which enables HE modulated OFDM symbol to have almost 4 multiples of data subcarriers. The fields of the HE PPDU formats are summarized in Table 1 and the L-STF, L-LTF, L-SIG, RL-SIG, HE-SIG-A, and HE-SIG-B fields are referred to as the Pre-HE modulated fields, while HE-STF, HE-LTF and Data fields are referred to as the HE modulated fields.

TABLE 1

| Field | Description |
| --- | --- |
| L-STF | Non-HT Short Training field |
| L-LTF | Non-HT Long Training field |
| L-SIG | Non-HT SIGNAL field |
| RL-SIG | Repeated Non-HT SIGNAL field |
| HE-SIG-A | HE SIGNAL A field |
| HE-SIG-B | HE SIGNAL B field |
| HE-STF | HE Short Training field |
| HE-LTF | HE Long Training field |
| Data | The Data field carrying the PSDU(s) |
| PE | Packet extension field |

Figure 7:
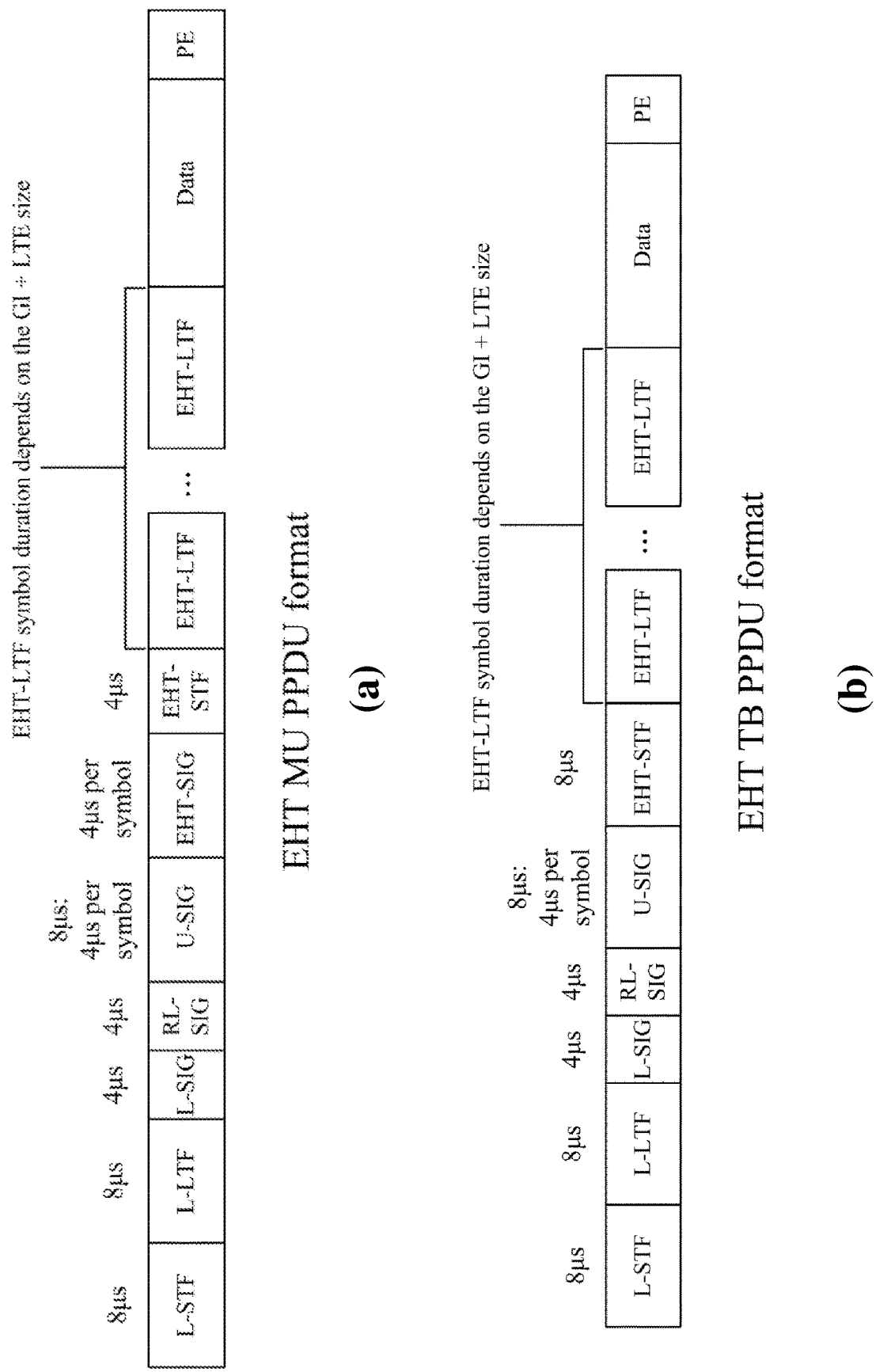
FIG. 7 illustrates an example of EHT PPDU format according to an embodiment of the present disclosure.

FIG. 7 illustrates an example of EHT PPDU format according to an embodiment of the present disclosure.

Referring to FIG. 7, in EHT, two EHT PPDU formats are defined: EHT MU PPDU ((a) of FIG. 7)) and EHT TB PPDU ((b) of FIG. 7)). EHT MU PPDU is used for both single user transmission and multi-user transmission. The EHT MU PPDU is not a response to a triggering frame. In the EHT MU PPDU, the EHT-SIG field is present. EHT TB PPDU is used for a transmission that is a response to a triggering frame from an AP. In the EHT TB PPDU, the EHT-SIG field is not present. The fields of the EHT PPDU formats are summarized in Table 2.

TABLE 2

| Field | Description |
| --- | --- |
| L-STF | Non-HT Short Training field |
| L-LTF | Non-HT Long Training field |
| L-SIG | Non-HT SIGNAL field |
| RL-SIG | Repeated Non-HT SIGNAL field |
| U-SIG | Universal SIGNAL field |
| EHT-SIG | EHT SIGNAL field |
| EHT-STF | EHT Short Training field |
| EHT-LTF | EHT Long Training field |
| Data | The Data field carrying the PSDU(s) |
| PE | Packet extension field |

The concept of preamble puncturing has been introduced since 11ax. It is a mechanism whereby OFDMA is used to avoid transmissions in certain subcarriers. For PPDU bandwidths greater than or equal to 80 MHz, the HE PHY supports preamble punctured HE MU PPDU transmissions where pre-HE modulated fields (before HE STF field) are not transmitted in one or more of the nonprimary 20 MHz channels, and RUs associated with those punctured 20 MHz channels are not allocated. In HE MU PPDU, there is a field to indicate which subchannels are punctured.

In 11be, preamble puncturing is applicable to OFDMA transmission and non-OFDMA transmission (single user transmission or full bandwidth MU-MIMO transmission). In PHY, the puncturing patterns are defined in the Punctured Channel Information field in EHT MU PPDU. For OFDMA cases, a 4-bit bitmap that tells which 20 MHz subchannel is punctured in the relevant 80 MHz sublock is defined where a value of 0 indicates that the corresponding 20 MHz subchannel is punctured. The allowed punctured patterns are defined for an 80 MHz subblock: 1111, 0111, 1011, 1101, 1110, 0011, 1100, and 1001. Its value could be variable for each 80 MHz subblock when channel operating bandwidth is larger than 80 MHz. For non-OFDMA cases, 5 bit of punctured channel indication is used to signal the non-OFDMA puncturing pattern of the entire PPDU bandwidth as shown in Table 3.

TABLE 3

| PPDU bandwidth | Cases | Puncturing pattern | Field value |
| --- | --- | --- | --- |
| 20/40 MHz | No puncturing | [1 1 1 1] | 0 |
| 80 MHz | No puncturing | [1 1 1 1] | 0 |
|  | 20 MHz puncturing | [x 1 1 1] | 1 |
|  |  | [1 x 1 1] | 2 |
|  |  | [1 1 x 1] | 3 |
|  |  | [1 1 1 x] | 4 |
| 160 MHz | No puncturing | [1 1 1 1 1 1 1 1] | 0 |
|  | 20 MHz puncturing | [x 1 1 1 1 1 1 1] | 1 |
|  |  | [1 x 1 1 1 1 1 1] | 2 |
|  |  | [1 1 x 1 1 1 1 1] | 3 |
|  |  | [1 1 1 x 1 1 1 1] | 4 |
|  |  | [1 1 1 1 x 1 1 1] | 5 |
|  |  | [1 1 1 1 1 x 1 1] | 6 |
|  |  | [1 1 1 1 1 1 x 1] | 7 |
|  |  | [1 1 1 1 1 1 1 x] | 8 |
|  | 40 MHz puncturing | [x x 1 1 1 1 1 1] | 9 |
|  |  | [1 1 x x 1 1 1 1] | 10 |
|  |  | [1 1 1 1 x x 1 1] | 11 |
|  |  | [1 1 1 1 1 1 x x] | 12 |
| 320 MHz | No puncturing | [1 1 1 1 1 1 1 1] | 0 |
|  | 40 MHz puncturing | [x 1 1 1 1 1 1 1] | 1 |
|  |  | [1 x 1 1 1 1 1 1] | 2 |
|  |  | [1 1 x 1 1 1 1 1] | 3 |
|  |  | [1 1 1 x 1 1 1 1] | 4 |
|  |  | [1 1 1 1 x 1 1 1] | 5 |
|  |  | [1 1 1 1 1 x 1 1] | 6 |
|  |  | [1 1 1 1 1 1 x 1] | 7 |
|  |  | [1 1 1 1 1 1 1 x] | 8 |
|  | 80 MHz puncturing | [x x 1 1 1 1 1 1] | 9 |
|  |  | [1 1 x x 1 1 1 1] | 10 |
|  |  | [1 1 1 1 x x 1 1] | 11 |
|  |  | [1 1 1 1 1 1 x x] | 12 |
|  | 320-80-40 | [x x x 1 1 1 1 1] | 13 |
|  |  | [x x 1 x 1 1 1 1] | 14 |
|  |  | [x x 1 1 x 1 1 1] | 15 |
|  |  | [x x 1 1 1 x 1 1] | 16 |
|  |  | [x x 1 1 1 1 x 1] | 17 |
|  |  | [x x 1 1 1 1 1 x] | 18 |
|  |  | [x 1 1 1 1 1 x x] | 19 |
|  |  | [1 x 1 1 1 1 x x] | 20 |
|  |  | [1 1 x 1 1 1 x x] | 21 |
|  |  | [1 1 1 x 1 1 x x] | 22 |
|  |  | [1 1 1 1 x 1 x x] | 23 |
|  |  | [1 1 1 1 1 x x x] | 24 |

Note that in the puncturing patterns in Table 3 above, a "1" denotes a non-punctured subchannel and an "x" denotes a punctured subchannel. The puncturing granularity for 80

MHz and 160 MHz PPDU bandwidth is 20 MHz, and the puncturing granularity for 320 MHz PPDU bandwidth is 40 MHz.

Moreover, given broader channel bandwidth (up to 160 MHz in 11ac, and up to 320 MHz in 11be) for new amendments, this preamble puncturing has been applicable to non-HT duplicate transmission wherein non-HT PPDU is duplicated every 20 MHz subchannels except for the 20 MHz subchannels to be punctured. To indicate which 20 MHz subchannels are punctured, the parameter INACTIVE_SUBCHANNELS are defined to be set by MAC through TXVECTOR parameters because non-HT PPDU does not have enough space to include those indication.

In 11be, preamble puncturing is appliable to different type of frames. The indication of which subchannels are punctured in a control (e.g., RTS, MU-RTS Trigger, CTS or etc), data or management frame that is carried in a non-HT duplicate PPDU can be conveyed from the MAC to the PHY through the TXVECTOR parameter INACTIVE_SUBCHANNELS. The parameter INACTIVE SUB CHANNELS may be present in the TXVECTOR of a non-HT duplicate PPDU or EHT PPDU that carries a control, data or management frame. Given 11be supporting up to 320 MHz channel bandwidth, size of the parameter INACTIVE_SUBCHANNELS should be 16 bits. For the new amendments, the basic assumption is that now the parameter INACTIVE_SUBCHANNELS could be used in not only non-HT duplicate PPDU but also EHT PPDU. And puncturing pattern signaling is not limited to NDP Announcement frame or NDP frame.

Given at least two different types of indication being defined, there is need to set up a rule. On top of that, the indication could be dynamic or static.

Figure 8:
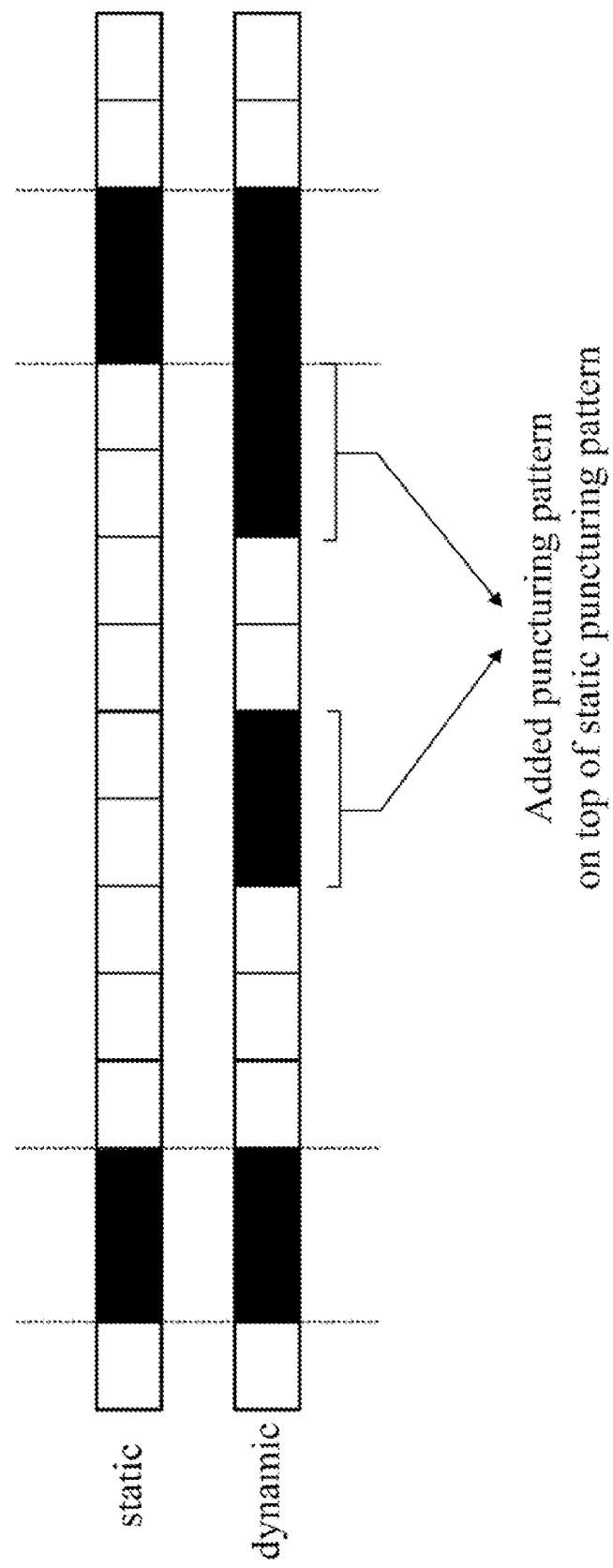
FIG. 8 illustrates different types of indication according to an embodiment of the present disclosure.

FIG. 8 illustrates different types of indication according to an embodiment of the present disclosure.

Figure 9:
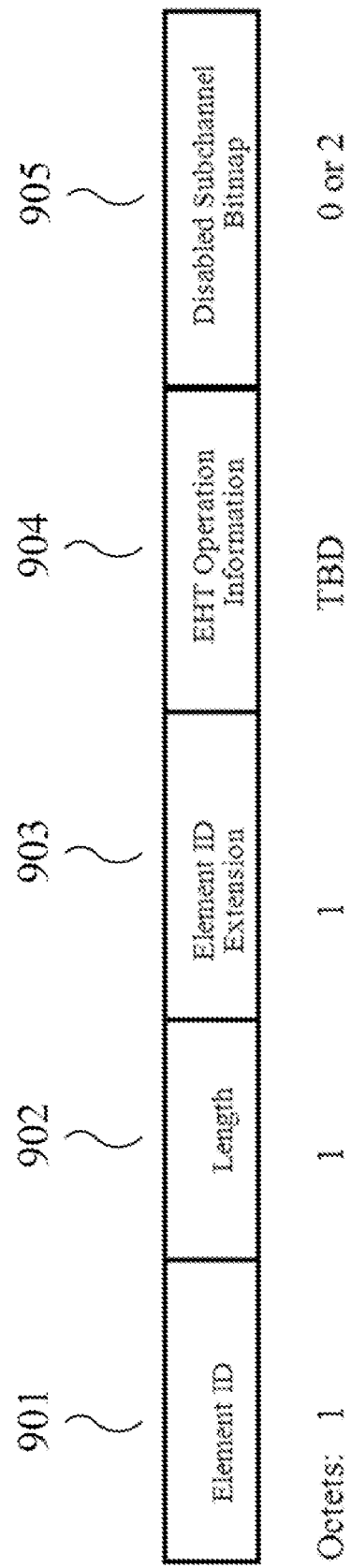
FIG. 9 illustrates the format of the operation element including the static puncturing channel indication according to an embodiment of the present disclosure.

Referring to FIG. 8, a static puncturing channel indication is likely to reflect the local regulation and channel characteristics which do not allow some specific channels for the BSS. It means at least those channels are likely to be punctured for a relatively long time. For example, the static puncturing channel indication could be provided with the EHT Operation element as shown in FIG. 9 below wherein this element could be carried in a management frame such as a beacon frame. Once the management frame including the static puncturing channel indication is received, the puncturing pattern for the static puncturing channel indication could be used unless additional indication (e.g., the dynamic puncturing channel indication or another static puncturing channel indication) is not correctly received. On the other hand, the dynamic puncturing indication could be dynamically updated in accordance with the channel measurement depending on the circumstances. For example, the dynamic puncturing indication should contain the static puncturing pattern.

FIG. 9 illustrates the format of the EHT Operation element according to an embodiment of the present disclosure.

Referring to FIG. 9, the format of the EHT Operation element 900 includes Element ID field 901, Length field 902, Element ID Extension filed 903, EHT Operation Information field 904 and Disabled Subchannel Bitmap field 905. The EHT Operation element is identified by the Element ID field 901 and, if present, the Element ID Extension field 904. The Length field 902 indicates the number of octets in the EHT Operation element excluding the Element ID field 901 and the Length field 902. The subfields of the EHT Operation information field 904 are defined in Table 4. Referring to Table 4, the EHT Operation information field 904 includes Channel Width subfield, channel center frequency segment (CCFS) information field, and Disabled Subchannel Bitmap Present subfield. The Channel Width subfield indicates the EHT BSS channel width set to 0 for 20 MHz, 1 for 40 MHz, 2 for 80 MHz, 3 for 160 MHz, and 4 for 320 MHz and channel center frequency segment (CCFS) information subfield indicates the channel center frequency for a 20, 40, 80, 160 or 320 MHz EHT BSS. The Disabled Subchannel Bitmap Present subfield indicates whether the Disabled Subchannel Bitmap filed 905 is present. For example, the Disabled Subchannel Bitmap field 905 is present if the Disabled Subchannel Bitmap Present subfield is 1, otherwise, the Disabled Subchannel Bitmap field 905 is not present. The Disabled Subchannel Bitmap field 905 provides a list of subchannels that are punctured within the BSS bandwidth, if present.

TABLE 4

| Subfield | Definition | Encoding |
|---|---|---|
| Channel Width | This field defines the EHT BSS bandwidth. | Set to 0 for 20 MHz EHT BSS bandwidth. Set to 1 for 40 MHz EHT BSS bandwidth. Set to 2 for 80 MHz EHT BSS bandwidth. Set to 3 for 160 MHz EHT BSS bandwidth. Set to 4 for 320 MHz EHT BSS bandwidth. Other values are reserved. |
| CCFS | TBD | TBD |
| Disabled Subchannel Bitmap Present | Indicates whether the Disabled Subchannel Bitmap field is present or not. | Set to 1 if the Disabled Subchannel Bitmap field is present; set to 0 otherwise. |

EHT duplicate (DUP) transmission is a mode wherein the transmitted data in the payload portion of the PPDU is duplicated in frequency. EHT DUP mode is an optional feature that is applicable only in the 6 GHz band. EHT DUP mode is applicable only for single user transmission in an EHT MU PPDU over bandwidth 80/160/320 MHz without preamble puncturing. It is applicable only in conjunction with BPSK-DCM modulation, rate-1/2 LDPC coding, and one spatial stream.

EHT DUP mode is signaled by setting the PPDU Type And Compression Mode subfield of U-SIG to 1 to indicate an EHT transmission to single user, and setting the modulation and coding scheme (MCS) field in EHT-SIG field to 14.

In EHT DUP mode, the encoding and modulation are described as follows:

For an 80 MHz EHT MU PPDU transmitted in EHT DUP mode, encoding and binary phase shift keying (BPSK)-dual carrier modulation (DCM) modulation are done for the first (e.g. lower) 484-tone RU, and then the first 484-tone RU is duplicated to the second (e.g. upper) 484-tone RU along with a partial sign change to reduce peak-to-average power ratio (PAPR).

For a 160 MHz EHT MU PPDU transmitted in EHT DUP mode, encoding and BPSK-DCM modulation are done for the first 996-tone RU, and then the first 996-tone RU is duplicated to the second 996-tone RU along with a partial sign change to reduce PAPR.

For a 320 MHz EHT MU PPDU transmitted in EHT-DUP mode, encoding and BPSK-DCM modulation are done for first 2×996-tone RU, and then the first 2×996-tone RU is duplicated to the second 2×996-tone RU along with a partial sign change to reduce PAPR.

The above frequency domain duplication occurs after low density parity check code (LDPC) tone mapping and segment deparsing operations if present. The details of the duplication and partial sign change operations are described as below.

Figure 10:
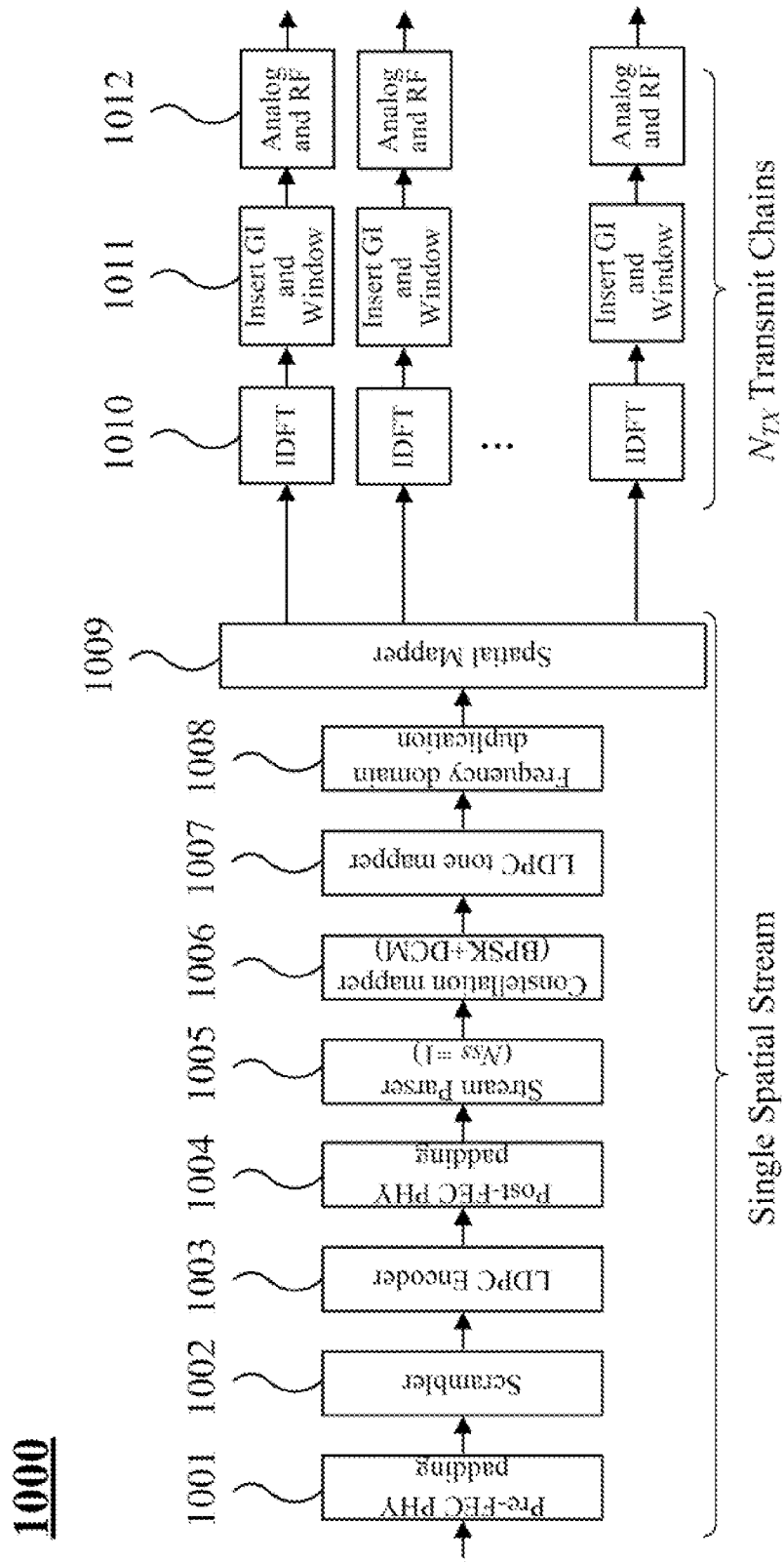
FIG. 10 illustrates a block diagram of transmitter for the transmission of the 80 MHz EHT MU PPDU and the 160 MHz EHT MU PPDU in EHT DUP mode according to an embodiment of the present disclosure.

FIG. 10 illustrates a block diagram of transmitter for the transmission of the 80 MHz EHT MU PPDU and the 160 MHz EHT MU PPDU with EHT DUP mode according to an embodiment of the present disclosure.

Referring FIG. 10, the transmitter 1000 includes pre-FEC PHY padding module 1001, scrambler 1002, LDPC encoder 1003, post-FEC padding module 1004, stream parser 1005, constellation mapper 1006, LDPC tone mapper 1007, frequency domain duplication module 1008 and spatial mapper 1009 for single spatial stream and a plurality of IDFT modules 1010, a plurality of insert GI and window modules 1011, and a plurality of analog and RF modules 1012 for a plurality of transmit chains. A data signal passes through the pre-FEC PHY padding module 1001, the scrambler 1002, the LDPC encoder 1003, the post-FEC padding module 1004, and the stream parser 1005. In EHT DUP mode, for 80 MHz EHT MU PPDU with 484-tone RU and the 160 MHz EHT MU PPDU with 996-tone RU, the segment parser (not shown) is bypassed and BPSK modulation with DCM (BPSK-DCM modulation) is done for an input signal of the constellation mapper 1006 (also, output signal of the stream parser 1005) as shown in Equation 1.

$$y=[x\ x_{DCM}],\ \text{where}\ x_{DCM}=(-1)^{k+N_{SD}}*x\ \text{and}\ k=[0,\ldots,N_{SD}-1] \quad \text{Equation 1}$$

Here, x is the input signal of the constellation mapper 1006, y is a output signal of the constellation mapper 1006, and $N_{SD}$ is a number of subcarriers (or tones).

The output signal of the constellation mapper 1006 passes through the LDPC tone mapper 1007 and is duplicated to map to two RUs by the frequency domain duplication module 1008 as shown in Equation 2.

$$z=[y\text{-}x\ x_{DCM}] \quad \text{Equation 2}$$

Here, z is a output signal of the frequency domain duplication module 1008 and y is the signal of the constellation mapper 1006 to which LDPC tone mapping is performed by the LDPC tone mapper 1007.

Subsequently, the output signal of the frequency domain duplication module 1008 passes through the spatial mapper 1009, one of the plurality of IDFT modules 1010, one of the plurality of insert GI and window modules 1011 and one of the plurality of analog and RF modules 1012.

Figure 11:
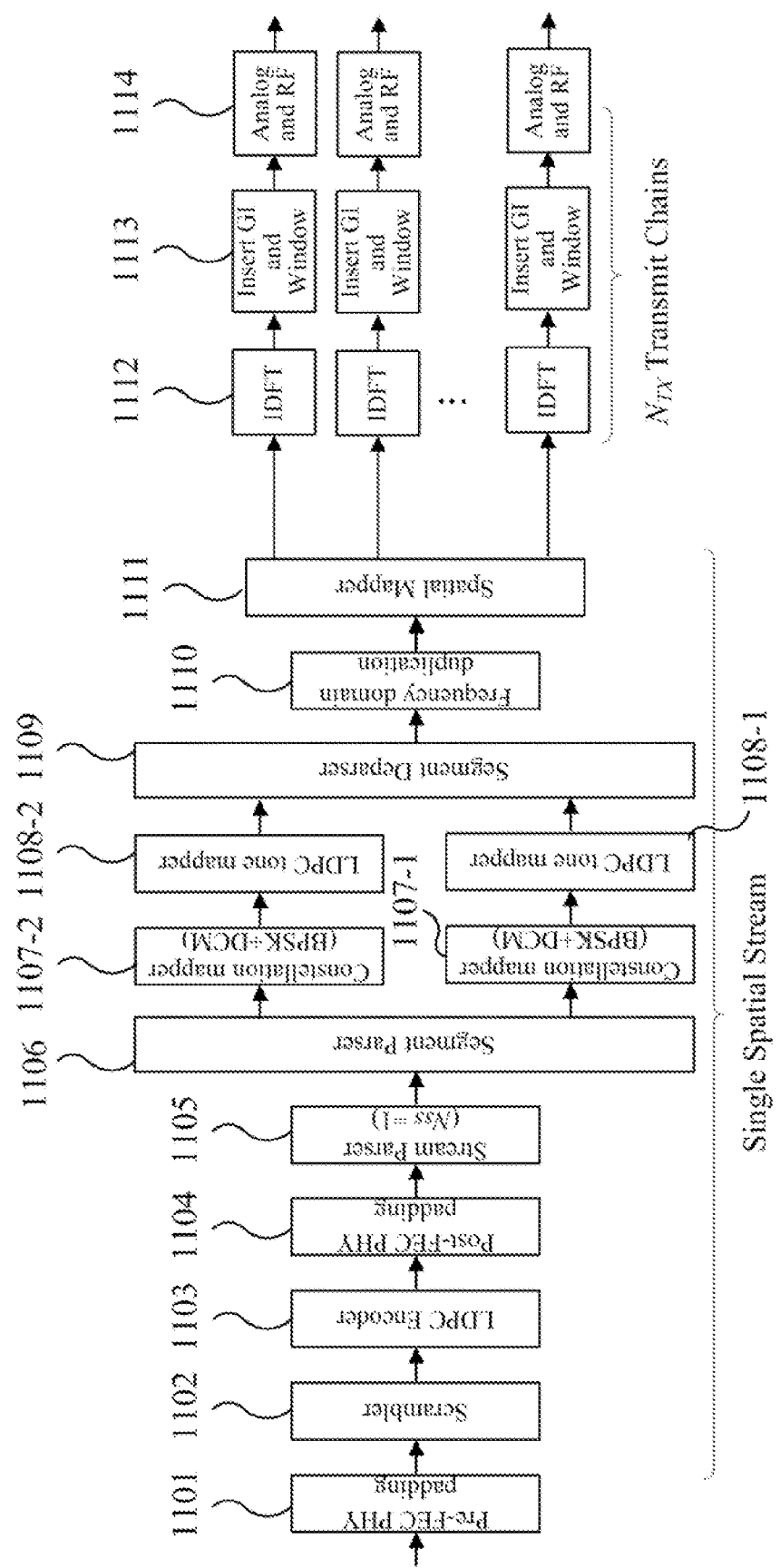
FIG. 11 illustrates a block diagram of transmitter for the transmission of the 320 MHz EHT MU PPDU in EHT DUP mode according to an embodiment of the present disclosure.

FIG. 11 illustrates a block diagram of transmitter for the transmission of the 320 MHz EHT MU PPDU with EHT DUP mode according to an embodiment of the present disclosure.

Referring FIG. 11, the transmitter 1100 includes pre-FEC PHY padding module 1101, scrambler 1102, LDPC encoder 1103, post-FEC padding module 1104, stream parser 1105, segment parser 1106, lower constellation mapper 1107-1, upper constellation mapper 1107-2, lower LDPC tone mapper 1108-1, upper LDPC tone mapper 1108-2, segment deparser 1109, frequency domain duplication module 1110 and spatial mapper 1111 for single spatial stream and a plurality of IDFT modules 1112, a plurality of insert GI and window modules 1113, and a plurality of analog and RF modules 1114 for a plurality of transmit chains. A data signal passes through the pre-FEC PHY padding module 1101, the scrambler 1102, the LDPC encoder 1103, the post-FEC padding module 1104, the stream parser 1105, and the segment parser 1106. In EHT DUP mode, for 320 MHz EHT MU PPDU, the output signal of segment parser 1106 is divided into lower output signal as lower input signal of the lower constellation mapper 1107-1 and upper output signal as upper input signal of the upper constellation mapper 1107-2. BPSK modulation with DCM (BPSK-DCM modulation) is done for the lower input signal of the lower constellation mapper 1107-1 as shown in Equation 3 and the upper input signal of the upper constellation mapper 1107-2 as shown in Equation 4.

$$y_L=[x_L\ x_{L,DCM}],\ \text{where}\ x_{L,DCM}=(-1)^{k+N_{SD}}*x_L\ \text{and}\ k=[0,\ldots,N_{SD}/2-1] \quad \text{Equation 3}$$

Here, $x_L$ is the lower input signal of the lower constellation mapper 1107-1 over lower $N_{SD}/2$ subcarriers, and $y_L$ is a output signal of the lower constellation mapper 1107-1, and $N_{SD}$ is a number of subcarriers (or tones).

$$y_U=[x_U\ x_{U,DCM}],\ \text{where}\ x_{U,DCM}=(-1)^{k+3/2N_{SD}}*x_U\ \text{and}\ k=[0,\ldots,N_{SD}/2-1] \quad \text{Equation 4}$$

Here, $x_U$ is the lower input signal of the upper constellation mapper 1107-2 over upper $N_{SD}/2$ subcarriers, and $y_U$ is a output signal of the upper constellation mapper 1107-2, and $N_{SD}$ is a number of subcarriers (or tones).

The lower output signal of the lower constellation mapper 1107-1 to which LDPC tone mapping is performed by the lower LDPC tone mapper 1108-1 and the upper output signal of the upper constellation mapper 1107-2 to which LDPC tone mapping is performed by the upper LDPC tone mapper 1108-2 are combined by the segment deparser 1109 as shown in Equation 5.

$$y=[x_L\ x_{L,DCM}\ x_U\ x_{U,DCM}] \quad \text{Equation 5}$$

Here, y is a output of the segment deparser 1109.

The output signal of the segment deparser 1109 is duplicated to map to two RUs by the frequency domain duplication module 1110 as shown in Equation 6.

$$z=[y\text{-}x_L\text{-}x_{L,DCM}\ x_U\ x_{U,DCM}] \quad \text{Equation 6}$$

Here, z is a output signal of the frequency domain duplication module 1110.

Subsequently, the output signal of the frequency domain duplication module 1110 passes through the spatial mapper 1111, one of the plurality of IDFT modules 1112, one of the plurality of insert GI and window modules 1113 and one of the plurality of analog and RF modules 1114.

Some notations in EHT-MCS 14 for EHT DUP mode when $N_{SS,u}=1$ are defined in Table 5.

TABLE 5

| Modulation | Bandwidth | R | $N_{BPSCS}$ | $N_{SD}$ | $N_{CBPS}$ | $N_{DBPS}$ | Data rate (Mb/s) | | |
|---|---|---|---|---|---|---|---|---|---|
| | | | | | | | 0.8 μs GI | 1.6 μs GI | 3.2 μs GI |
| BPSK-DCM | 80 MHz | 1/2 | 1 | 234 | 234 | 117 | 8.6 | 8.1 | 7.3 |
| BPSK-DCM | 160 MHz | 1/2 | 1 | 490 | 490 | 245 | 18.0 | 17.0 | 15.3 |
| BPSK-DCM | 320 MHz | 1/2 | 1 | 980 | 980 | 490 | 36.0 | 34.0 | 30.6 | where R is the coding rate for the a user, $N_{BPSCS}$ is the number of coded bit per subcarrier per spatial stream, $N_{SD}$ is the number of data subcarriers, $N_{CBPS}$ is the number of coded bits per OFDM symbol, and $N_{DBPS}$ is the number of data bits per OFDM symbol.

The EHT-STF, EHT-LTF, and pilot subcarriers for an 80 MHz EHT MU PPDU transmitted in EHT DUP mode are constructed in an identical manner to those of an EHT MU PPDU transmitted in OFDMA format with 484-tone RU1 and RU2 occupied. The EHT-STF, EHT-LTF, and pilot subcarriers for a 160/320 MHz EHT MU PPDU transmitted in EHT DUP mode are constructed in an identical manner to those of a 160/320 MHz EHT MU PPDU transmitted in non-OFDMA format.

The EHT STA obtains the channel configuration information from EHT Operation element if operating in the 6 GHz band. The AP shall set the Disabled Subchannel Bitmap Present subfield to 1 and include the Disabled Subchannel Bitmap field in the EHT Operation element if the AP punctures any subchannel for the BSS. Otherwise, the AP shall set the Disabled Subchannel Bitmap Present subfield to 0 and not include the Disabled Subchannel Bitmap field in the EHT Operation element.

The puncturing pattern indicated in the Disabled Subchannel Bitmap field of the EHT Operation element shall be one of the non-OFDMA puncturing patterns defined in Table 3 above for the PPDU bandwidth that is equal to the operating channel width of the BSS.

The AP may set each bit in the Disabled Subchannel Bitmap field to a value subject to the following constraints:
The resulting puncturing pattern is one of the puncturing patterns selected in Table 3 above.

A bit in the bitmap that corresponds to a 20 MHz subchannel outside the BSS bandwidth shall be set to 1.
The bit in the bitmap that corresponds to the primary 20 MHz subchannel shall be set to 0.

However, there is conflict between the presence of the Disabled Subchannel Bitmap and its puncturing pattern to be allowed because AP shall set the Disabled Subchannel Bitmap Present field to 1 if the AP punctures any subchannel for the BSS but the non-OFDMA puncturing patterns include non-puncturing cases as well.

Therefore, in legacy IEEE 802.11 standard, more clarification is required to make the operation clear. There are two options to define further operation depending on the original intention.

Given some of the puncturing patterns with non-puncturing case in the Table 3, when the puncturing pattern is indicated in the Disabled Subchannel Bitmap field of the EHT Operation element, this non-puncturing case is reserved not to be used for any PPDU bandwidth. This option resolves unmatched description that even though Disabled Subchannel Bitmap Present subfield is present, there is any non-punctured subchannel.

Reserved value could be Validate. Here, Validate means to serve to indicate whether to continue reception of a PPDU at an EHT STA. If an STA encounters a PPDU where at least value identified as Validate for the STA, the STA shall defer for the duration of the PPDU.

Table 6 shows examples of whether DUP transmission is allowed or not depending on the operating channel width of the BSS and its puncturing cases. When at least one of subchannel is punctured, then no puncturing cases are not supported. Or call it Reserved or Validate. In Table 6, Reserved is used.

TABLE 6

| Operating channel width of the BSS | Cases | Puncturing patterns in Disabled Subchannel Bitmap field | Field value |
|---|---|---|---|
| 20/40 MHz | No puncturing | Not present | Reserved |
| 80 MHz | No puncturing | Not present | Reserved |
| | 20 MHz puncturing | [0 1 0 0 1 1 1 1 1 1 1 1 1 1 1 1] | 1 |
| | | [0 1 0 0 1 1 1 1 1 1 1 1 1 1 1 1] | 2 |
| | | [0 0 1 0 1 1 1 1 1 1 1 1 1 1 1 1] | 3 |
| | | [0 0 0 1 1 1 1 1 1 1 1 1 1 1 1 1] | 4 |
| 160 MHz | No puncturing | Not present | Reserved |
| | 20 MHz puncturing | [1 0 0 0 0 0 0 0 1 1 1 1 1 1 1 1] 80 MHz DUP transmission allowed | 1 |
| | | [0 1 0 0 0 0 0 0 1 1 1 1 1 1 1 1] 80 MHz DUP transmission allowed | 2 |
| | | [0 0 1 0 0 0 0 0 1 1 1 1 1 1 1 1] 80 MHz DUP transmission allowed | 3 |
| | | [0 0 0 1 0 0 0 0 1 1 1 1 1 1 1 1] 80 MHz DUP transmission allowed | 4 |
| | | [0 0 0 0 1 0 0 0 1 1 1 1 1 1 1 1] 80 MHz DUP transmission allowed | 5 |
| | | [0 0 0 0 0 1 0 0 1 1 1 1 1 1 1 1] 80 MHz DUP transmission allowed | 6 |
| | | [0 0 0 0 0 0 1 0 1 1 1 1 1 1 1 1] 80 MHz DUP transmission allowed | 7 |
| | | [0 0 0 0 0 0 0 1 1 1 1 1 1 1 1 1] 80 MHz DUP transmission allowed | 8 |
| | 40 MHz puncturing | [1 1 0 0 0 0 0 0 1 1 1 1 1 1 1 1] 80 MHz DUP transmission allowed | 9 |
| | | [0 0 1 1 0 0 0 0 1 1 1 1 1 1 1 1] 80 MHz DUP transmission allowed | 10 |
| | | [0 0 0 0 1 1 0 0 1 1 1 1 1 1 1 1] 80 MHz DUP transmission allowed | 11 |
| | | [0 0 0 0 0 0 1 1 1 1 1 1 1 1 1 1] 80 MHz DUP transmission allowed | 12 |
| 320 MHz | No puncturing | Not present | Reserved |
| | 40 MHz puncturing | [1 1 0 0 0 0 0 0 0 0 0 0 0 0 0 0] 80/160 MHz DUP transmission allowed | 1 |
| | | [0 0 1 1 0 0 0 0 0 0 0 0 0 0 0 0] | 2 |

TABLE 6-continued

| Operating channel width of the BSS | Cases | Puncturing patterns in Disabled Subchannel Bitmap field | Field value |
|---|---|---|---|
| | | 80/160 MHz DUP transmission allowed [0 0 0 0 1 1 0 0 0 0 0 0 0 0 0 0] | 3 |
| | | 80/160 MHz DUP transmission allowed [0 0 0 0 0 0 1 1 0 0 0 0 0 0 0 0] | 4 |
| | | 80/160 MHz DUP transmission allowed [0 0 0 0 0 0 0 0 1 1 0 0 0 0 0 0] | 5 |
| | | 80/160 MHz DUP transmission allowed [0 0 0 0 0 0 0 0 0 0 1 1 0 0 0 0] | 6 |
| | | 80/160 MHz DUP transmission allowed [0 0 0 0 0 0 0 0 0 0 0 0 1 1 0 0] | 7 |
| | | 80/160 MHz DUP transmission allowed [0 0 0 0 0 0 0 0 0 0 0 0 0 0 1 1] | 8 |
| | 80 MHz puncturing | 80/160 MHz DUP transmission allowed [1 1 1 1 0 0 0 0 0 0 0 0 0 0 0 0] | 9 |
| | | 80/160 MHz DUP transmission allowed [0 0 0 0 1 1 1 1 0 0 0 0 0 0 0 0] | 10 |
| | | 80/160 MHz DUP transmission allowed [0 0 0 0 0 0 0 0 1 1 1 1 0 0 0 0] | 11 |
| | | 80/160 MHz DUP transmission allowed [0 0 0 0 0 0 0 0 0 0 0 0 1 1 1 1] | 12 |
| 320-80-40 | | 80/160 MHz DUP transmission allowed [1 1 1 1 1 1 0 0 0 0 0 0 0 0 0 0] | 13 |
| | | 80/160 MHz DUP transmission allowed [1 1 1 1 0 0 1 1 0 0 0 0 0 0 0 0] | 14 |
| | | 80/160 MHz DUP transmission allowed [1 1 1 1 0 0 0 0 1 1 0 0 0 0 0 0] | 15 |
| | | 80 MHz DUP transmission allowed [1 1 1 1 0 0 0 0 0 0 1 1 0 0 0 0] | 16 |
| | | 80 MHz DUP transmission allowed [1 1 1 1 0 0 0 0 0 0 0 0 1 1 0 0] | 17 |
| | | 80 MHz DUP transmission allowed [1 1 1 1 0 0 0 0 0 0 0 0 0 0 1 1] | 18 |
| | | 80 MHz DUP transmission allowed [1 1 0 0 0 0 0 0 0 0 0 0 1 1 1 1] | 19 |
| | | 80 MHz DUP transmission allowed [0 0 1 1 0 0 0 0 0 0 0 0 1 1 1 1] | 20 |
| | | 80 MHz DUP transmission allowed [0 0 0 0 1 1 0 0 0 0 0 0 1 1 1 1] | 21 |
| | | 80 MHz DUP transmission allowed [0 0 0 0 0 0 1 1 0 0 0 0 1 1 1 1] | 22 |
| | | 80 MHz DUP transmission allowed [0 0 0 0 0 0 0 0 1 1 0 0 1 1 1 1] | 23 |
| | | 80 MHz DUP transmission allowed [0 0 0 0 0 0 0 0 0 0 1 1 1 1 1 1] | 24 |
| | | 80/160 MHz DUP transmission allowed | |

Considering descriptions as below,

DUP mode shall only be used with bandwidth 80/160/320 MHz without preamble puncturing wherein bandwidth is PPDU bandwidth signaling in SIG field of the PPDU.

In an EHT BSS set up by an EHT AP that has included the Disabled Subchannel Bitmap field in the EHT Operation element, an EHT AP or an EHT STA shall set the TXVECTOR parameter INACTIVE SUBCHANNELS of an HE, EHT, or non-HT Duplicate PPDU based on the Disabled Subchannel Bitmap field.

A EHT AP or an EHT STA shall not transmit on any 20 MHz subchannel that is punctured as indicated in the TXVECTOR parameter INACTIVE SUBCHANNELS.

The channel width subfield in EHT Operation element indicates EHT BSS bandwidth.

A bit in the bitmap that corresponds to a 20 MHz subchannel outside the BSS bandwidth shall be set to 1.

The bit in the bitmap that corresponds to the primary 20 MHz subchannel shall be set to 0.

When transmitting a PPDU with DUP mode, the value in the Disabled Subchannel Bitmap field may limit the DUP mode operation because it is a static channel puncturing information even though each 20 MHz subchannel condition could be changed moment by moment. For example, 320 MHz DUP mode cannot be transmitted automatically when Disabled Subchannel Bitmap field is present because it might mean at least one of 20 MHz subchannels is punctured.

To manage those unnecessary limitation based on the legacy IEEE 802.11 standard especially for DUP mode, the present disclosure provides some embodiments. However, all or some of the embodiments below could be used together. Moreover, the present disclosure is not limited to DUP transmission. While the legacy IEEE 802.11 standard focus on adding more puncturing patterns on top of the value in the Disabled Subchannel Bitmap field, the present disclosure provides the ways more subchannels available for transmitting.

Embodiment 1

On the specific frequency band, the AP sets the Disabled Subchannel Bitmap Present subfield to 0 and not include the Disabled Subchannel Bitmap field in the EHT Operation element. Given DUP transmission applicable only to 6 GHz band, to increase the usage of DUP transmission and to secure broad bandwidth to transmit PPDU as much as possible if channel condition is available, its puncturing pattern in PPDU could better to be indicated when it is transmitted with the indication in SIG field or Trigger frame to solicit the responses.

Embodiment 2

The AP sets the Disabled Subchannel Bitmap Present subfield to 0 wherein the Disabled Subchannel Bitmap field is not included in the EHT Operation element. It could be supported under the certain conditions. Those conditions could be as follows:
- AP needs to support extended coverage
- AP sees the repeated errors detected.
- AP find itself locating on the cell edges.
- LPI (Lower Power Indoor) condition is given when it deploys.
- During some specific period.
  - For example, specific period could be the TWT (Target Wake Time) service period.
  - For example, specific period could be TXOP On top of it, when some interference is detected on the specific 20 MHz subchannels, puncturing information in SIG field of the transmitting MU PPDU or RU/MRU assigned over non-punctured subchannels in TB PPDU could be used wherein it can allow dynamic puncturing patterns. It means under the certain condition described above, only dynamic puncturing information is allowed, and the AP can transmit PPDU with DUP mode as much as possible.

IEEE 802.11 standard has developed a TWT operation. TWTs allow STAs to be managed in the BSS by scheduling STAs to operate at different times in order to minimize contention between STAs and to reduce the required amount of time that a STA in PS mode needs to be awake.

There have been two cases to support TWT operations with 1) an Individual TWT agreements and 2) a Broadcast TWT. With an embodiment of the Individual TWT agreement concept, a TWT requester (a STA or an AP) communicates wake scheduling information with its TWT responder (the AP or the STA). The TWT responder devises a schedule and delivers corresponding TWT values to the TWT requester once the TWT agreements has been set up between them. In an embodiment of the broadcast TWT concept with the Beacon frames or Probe responding frames, an AP is allowed to devise schedules indicated TWT service period (SP) and deliver corresponding TWT values to STAs without the established individual TWT agreements to each other.

Embodiment 3

In case the AP sets the Disabled Subchannel Bitmap Present subfield to 1 and includes the Disabled Subchannel Bitmap field in the EHT Operation element, (the AP punctures any 20 MHz subchannel for the BSS), the AP may set each bit in the Disabled Subchannel Bitmap field to a value subject to the following constraints,
- The resulting puncturing pattern is one of the puncturing patterns defined in SIG field.
- A bit in the bitmap that corresponds to a 20 MHz subchannel outside the BSS bandwidth shall be set to 1.
- The bit in the bitmap that corresponds to the primary 20 MHz subchannel shall be set to 0.
- When an AP transmits the PPDU with DUP mode, the AP ignores the value in the Disabled Subchannel Bitmap field and sets TXVECTOR parameter INACTIVE_SUBCHANNELS of an EHT PPDU to all 0s.
- When a transmitter (an AP or a STA) transmits the PPDU with DUP mode, the transmitter ignores the value in the Disabled Subchannel Bitmap field and sets TXVECTOR parameter INACTIVE SUBCHANNELS of an EHT PPDU to all 0s.

When receiving the PPDU in this embodiment, a receiver cannot expect whether the PPDU includes punctured 20 MHz subchannels or not based on the presence of the Disabled Subchannel Bitmap field. This can increase the flexibility whether to transmit/receive the PPDU with DUP mode. However, it is likely to be ready for combining legacy portion of the receiving PPDU. It may require additional complexity such as carrier frequency offset (CFO), sync, carrier sensing, possibility of punctured legacy portion.

Embodiment 4

When transmitting the PPDU with DUP mode, a transmitter (an AP or a STA) ignores those indicated in the Disabled Subchannel Bitmap field in the EHT Operation element and the values in TXVECTOR parameter INACTIVE SUBCHANNELS wherein a first value in the Disabled Subchannel Bitmap field and a second value in TXVECTOR parameter INACTIVE SUBCHANNELS. The second value is set to the first value in this embodiment.

Instead, an EHT AP uses puncturing indication in SIG field with non-puncturing case in MU PPDU for DUP mode. When receiving the PPDU in this embodiment, a receiver cannot expect whether the PPDU includes punctured 20 MHz subchannels or not. This can increase the flexibility whether to transmit/receive the PPDU with DUP mode. However, it is likely to be ready for combining legacy portion of the receiving PPDU. It may require additional complexity such as CFO, sync, carrier sensing, possibility of punctured legacy portion.

Regardless of the present disclosure above, when receiving the PPDU, an AP or a STA might have two puncturing information. The first puncturing information is from the Disabled Subchannel Bitmap field in the EHT Operation element. The second puncturing information is from the SIG field or RU/MRU location information in Trigger frame.
If each information is different:
- Option 1) the AP or the STA determines to use the puncturing patterns dynamically to be transmitted in SIG field or Trigger frame when decoding the physical layer convergence protocol (PLCP) service data unit (PSDU) portion of the receiving PPDU.
- Option 2) the AP or the STA determines to use the puncturing pattern which includes more punctured subchannels (it means overlapped subchannels) to avoid the decode noise values and to make sure the non-punctured subchannels in common.

What is claimed is:
1. A method performed by a transmitter in a wireless communication system, the method comprising:
identifying that a first parameter used for indicating a first puncturing pattern is set to be not present in a first frame based on predetermined condition;
determining whether to operate in duplicate (DUP) mode; and
in case that the transmitter determines to operate in the DUP mode, transmitting a second frame in the DUP mode,
wherein data in a payload portion of the second frame is duplicated in frequency in the DUP mode, wherein the transmitter is an extreme high throughput (EHT) STA or an EHT access point (AP),
wherein the predetermined condition includes at least one of:
- when the EHT AP needs to support extended coverage;
- when the EHT AP sees repeated errors detected;
- when the EHT AP finds itself locating on cell edges;
- when lower power indoor (LPI) condition is given if the LPI condition deploys; or
- when a specific period including at least one of target wake time (TWT) service period or transmit opportunity (TXOP) is satisfied.

2. The method of claim 1, wherein a type of the first frame includes a beacon frame including operation element, and wherein the first parameter includes a disabled subchannel bitmap field of the operation element.

3. The method of claim 1, wherein a type of the second frame includes a EHT PPDU frame.

4. The method of claim 1, wherein when an interference is detected on at least one channel, at least one of puncturing information in a universal signal (U-SIG) field of an EHT multi-user (MU) physical layer protocol data unit (PPDU) or resource unit (RU)/multi RU (MRU) assigned over at least one non-punctured channel in trigger based (TB) PPDU is used to puncture the at least one channel.

5. A method performed by a transmitter in a wireless communication system, the method comprising:
identifying that a first parameter used for indicating a first puncturing pattern is set to be present in a first frame;
determining whether to operate in duplicate (DUP) mode; and
in case that the transmitter determines to operate in the DUP mode, setting a second parameter in a second frame to all 0s and transmitting the second frame in the DUP mode without considering the first puncturing pattern indicated by the first parameter,
wherein data in a payload portion of the second frame is duplicated in frequency in the DUP mode,
wherein the transmitter is an extreme high throughput (EHT) STA or an EHT access point (AP),
wherein a type of the second frame includes a EHT PPDU frame, and
wherein the second parameter includes an inactive subchannel field in the second frame.

6. The method of claim 5, wherein a type of the first frame includes a beacon frame, and
wherein the first parameter includes a disabled subchannel bitmap field in the first frame.

7. A transmitter in a wireless communication system, the transmitter comprising:
a transceiver; and
a processor configured to:
identify that a first parameter used for indicating a first puncturing pattern is set to be not present in a first frame based on predetermined condition;
determine whether to operate in duplicate (DUP) mode; and
in case that the transmitter determines to operate in the DUP mode, control the transceiver to transmit a second frame in the DUP mode,
wherein data in a payload portion of the second frame is duplicated in frequency in the DUP mode,
wherein the transmitter is an extreme high throughput (EHT) STA or an EHT access point (AP),
wherein the predetermined condition includes at least one of:
- when the EHT AP needs to support extended coverage;
- when the EHT AP sees repeated errors detected;
- when the EHT AP finds itself locating on cell edges;
- when lower power indoor (LPI) condition is given if the LPI condition deploys; or
- when a specific period including at least one of target wake time (TWT) service period or transmit opportunity (TXOP) is satisfied.

8. The transmitter of claim 7, wherein a type of the first frame includes a beacon frame including operation element, and wherein the first parameter includes a disabled subchannel bitmap field of the operation element.

9. The transmitter of claim 7, wherein a type of the second frame includes a EHT PPDU frame.

10. The transmitter of claim 7, wherein when an interference is detected on at least one channel, at least one of puncturing information in a universal signal (U-SIG) field of an EHT multi-user (MU) physical layer protocol data unit (PPDU) or resource unit (RU)/multi RU (MRU) assigned over at least one non-punctured channel in trigger based (TB) PPDU is used to puncture the at least one channel.

* * * * *